United States Patent
Ramarao

(10) Patent No.: US 8,832,034 B1
(45) Date of Patent: Sep. 9, 2014

(54) SPACE-EFFICIENT, REVISION-TOLERANT DATA DE-DUPLICATION

(75) Inventor: Karempudi V. Ramarao, San Ramon, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 155 days.

(21) Appl. No.: 12/754,537

(22) Filed: Apr. 5, 2010

Related U.S. Application Data

(63) Continuation-in-part of application No. 12/495,432, filed on Jun. 30, 2009, now Pat. No. 8,370,309.

(60) Provisional application No. 61/078,324, filed on Jul. 3, 2008, provisional application No. 61/092,740, filed on Aug. 28, 2008.

(51) Int. Cl.
*G06F 17/30* (2006.01)

(52) U.S. Cl.
USPC .......................................... 707/664

(58) Field of Classification Search
USPC ........................ 707/664, 692, 693
See application file for complete search history.

(56) References Cited

U.S. PATENT DOCUMENTS

| | | | |
|---|---|---|---|
| 6,667,700 B1 | 12/2003 | McCanne et al. | |
| 6,904,430 B1 | 6/2005 | Livshits | |
| 6,925,467 B2 | 8/2005 | Gu et al. | |
| 7,200,604 B2 | 4/2007 | Forman et al. | |
| 7,281,006 B2 | 10/2007 | Hsu et al. | |
| 7,305,532 B2 | 12/2007 | Zhu et al. | |
| 7,504,969 B2 | 3/2009 | Patterson et al. | |
| 7,523,098 B2 | 4/2009 | Hirsch | |
| 7,930,559 B1 | 4/2011 | Beaverson et al. | |
| 7,962,520 B2 | 6/2011 | Patterson et al. | |
| 8,468,320 B1* | 6/2013 | Stringham | 711/170 |
| 2004/0139072 A1 | 7/2004 | Broder et al. | |
| 2004/0187075 A1 | 9/2004 | Maxham et al. | |
| 2004/0260694 A1* | 12/2004 | Chaudhuri et al. | 707/5 |
| 2005/0131939 A1 | 6/2005 | Douglis et al. | |
| 2005/0210043 A1 | 9/2005 | Manasse | |
| 2006/0047855 A1 | 3/2006 | Gurevich et al. | |
| 2006/0059207 A1 | 3/2006 | Hirsch et al. | |
| 2006/0112148 A1 | 5/2006 | Jennings et al. | |
| 2007/0085716 A1 | 4/2007 | Bar-Yossef et al. | |
| 2008/0005141 A1 | 1/2008 | Zheng et al. | |
| 2008/0005201 A1 | 1/2008 | Ting et al. | |
| 2008/0010278 A1 | 1/2008 | Kenci et al. | |
| 2008/0098083 A1 | 4/2008 | Shergill et al. | |
| 2008/0144079 A1 | 6/2008 | Pandey et al. | |
| 2008/0244172 A1 | 10/2008 | Kano | |
| 2008/0256143 A1 | 10/2008 | Reddy et al. | |
| 2009/0063528 A1 | 3/2009 | Yueh | |

(Continued)

OTHER PUBLICATIONS

Arthur Khu, "Xilinx FPGA Cofinguration Data and Decompression," Xilinx Corporation, Sep. 25, 2001, WP152 (v1.0), pp. 1-4.*

(Continued)

*Primary Examiner* — Alexey Shmatov
*Assistant Examiner* — Grace Park
(74) *Attorney, Agent, or Firm* — Charles Shemwell

(57) ABSTRACT

Data units within a de-duplication device are stored in single instances within a database of data units and then referenced as many times as necessary within a referencing dictionary, potentially achieving substantial compaction of the referencing dictionary and thus the storage requirement of the de-duplication device as a whole.

21 Claims, 17 Drawing Sheets

(56) References Cited

U.S. PATENT DOCUMENTS

2009/0063795 A1    3/2009  Yeh
2009/0089483 A1    4/2009  Tanaka et al.
2009/0193223 A1*   7/2009  Saliba et al. .................. 711/216

OTHER PUBLICATIONS

Navarro et al., "A Practical q-Gram Index for Text Retrieval Allowing Errors," CLEI Electronic Journal 1(2), 1998.*

Andrei Z. Broder, "Identifying and Filtering Near-Duplicate Documents," Compaq's System Research Center, Palo Alto, California, 1998; 10 pages.

Navendu Jain et al., "TAPER: Tiered Approach for Eliminating Redundancy in Replica Synchronization," FAST'05: 4th Usenix Conference on File and Storage Technologies, Austin, Texas, 2005 14 pages.

Punushottam Kulkarni, "Redundancy Elimination Within Large Collections of Files," University of Massachusetts, Amherst, MA, IBM, Dec. 22, 2003, 15 pages.

Athicha Muthitacharoen et al., "A Low-Bandwidth Network File System," MIT Laboratory for Computer Science and NYS Dept. of Computer Science, Banff Alberta, Canada, 2001 14 Pages.

Andrei Z. Broder, "Some Application of Rabin's Fingerprinting Method," Sequences II: Mehods in Communications, Security and Computer Science, Palo Alto, California, 1993, 10 pages.

Uldi Manbar, "Finding Similar Files in a Large File System," University of Arizona, Dept of Computer Science, Tucson, Arizona, Oct. 1993, 11 pages.

Calicrates Policroniades et al., "Proceedings of the General Track: 2004 Usenix Annual Technical Conference," Usenix Association, Boston, MA, 2004, 15 pages.

Benjamin Zhu et al., "Avoiding the Disk Bottleneck in the Data Domain Deduplication File System," FAST '08: 6th Usenix Conference on File and Storage Technologies, Usenix Association, San Jose CA, Feb. 29, 2008, pp. 269-282.

* cited by examiner (Prior-Art)

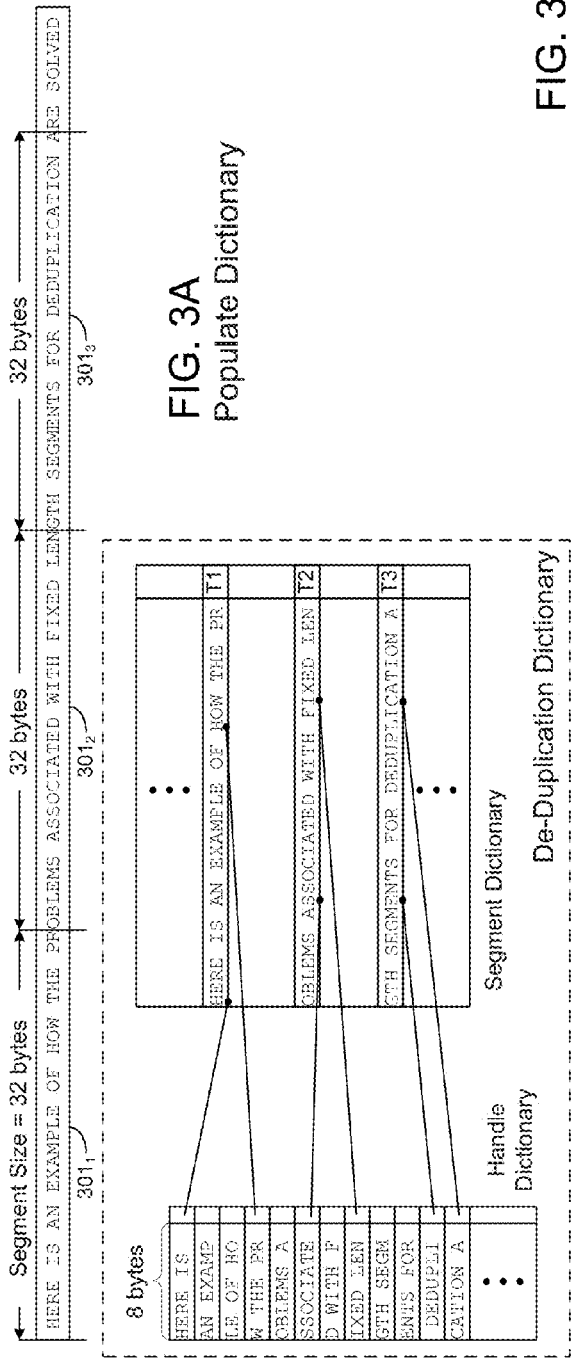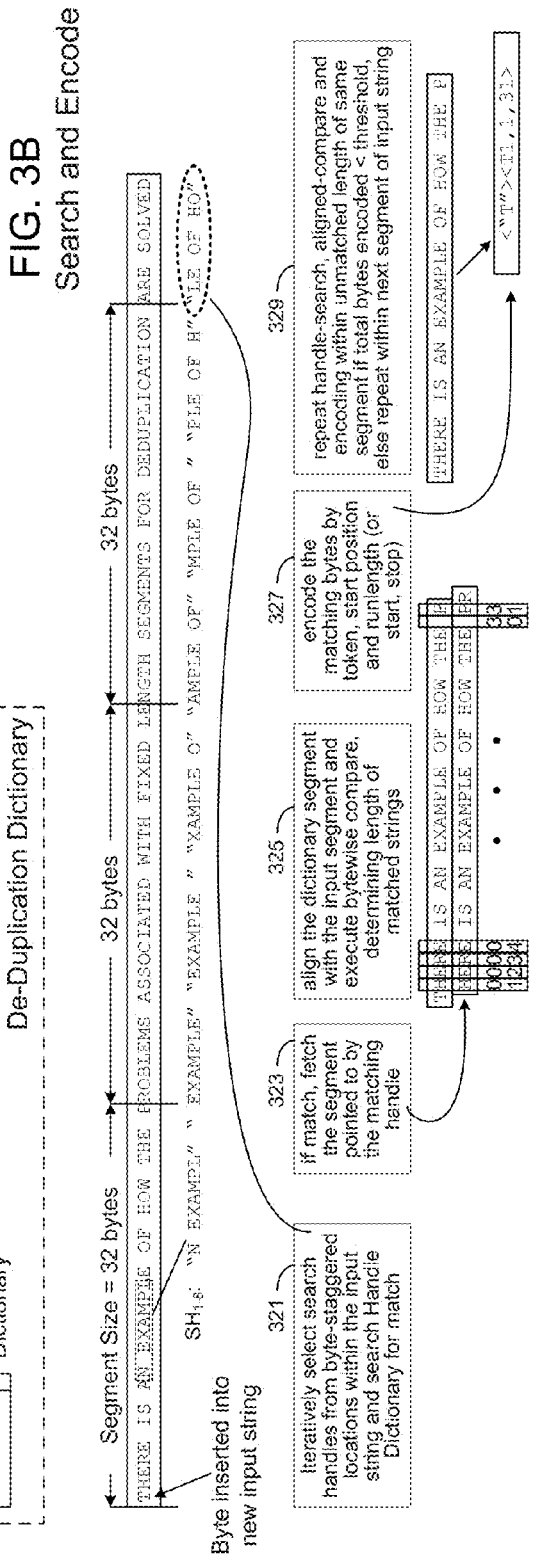

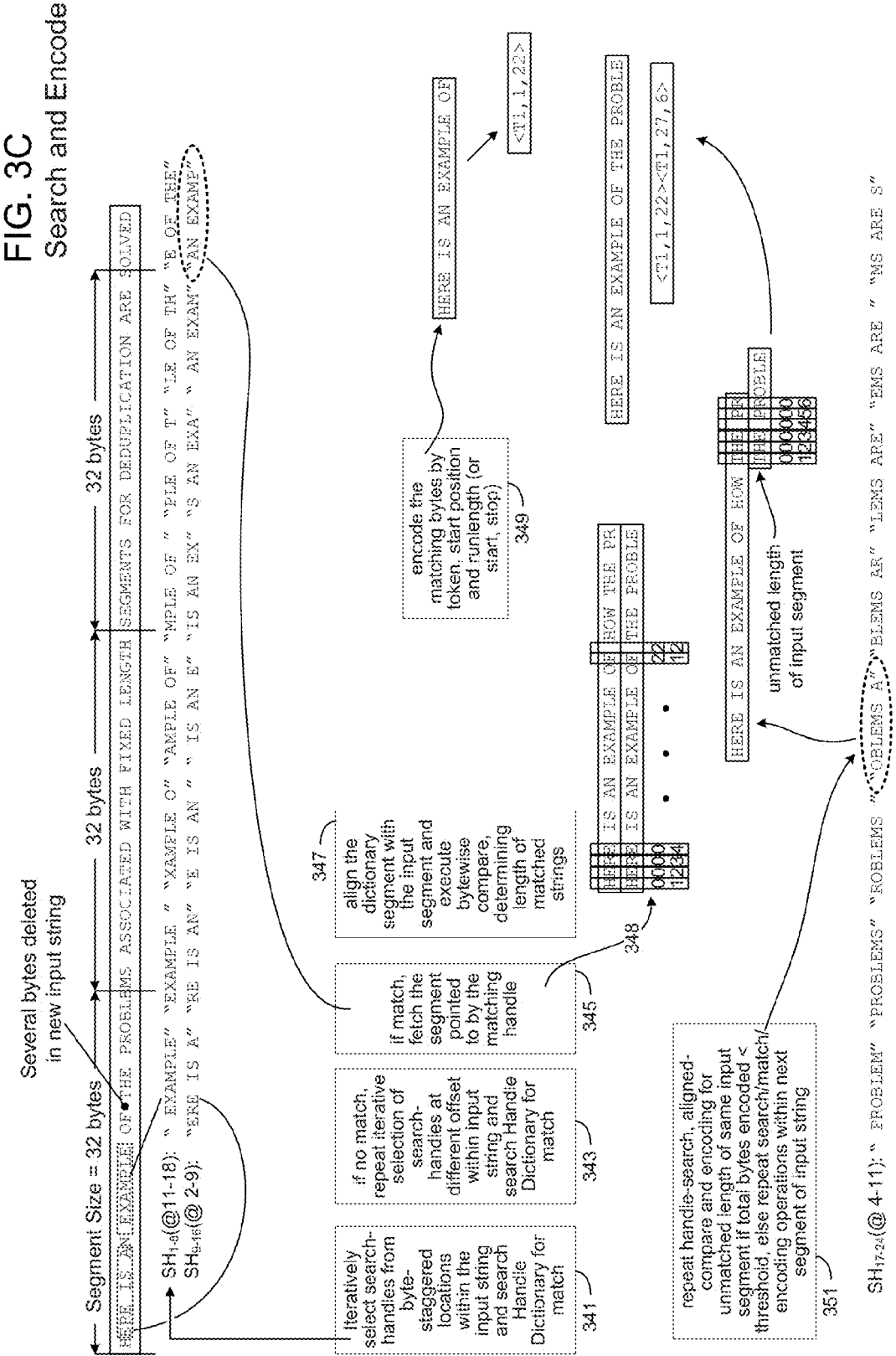

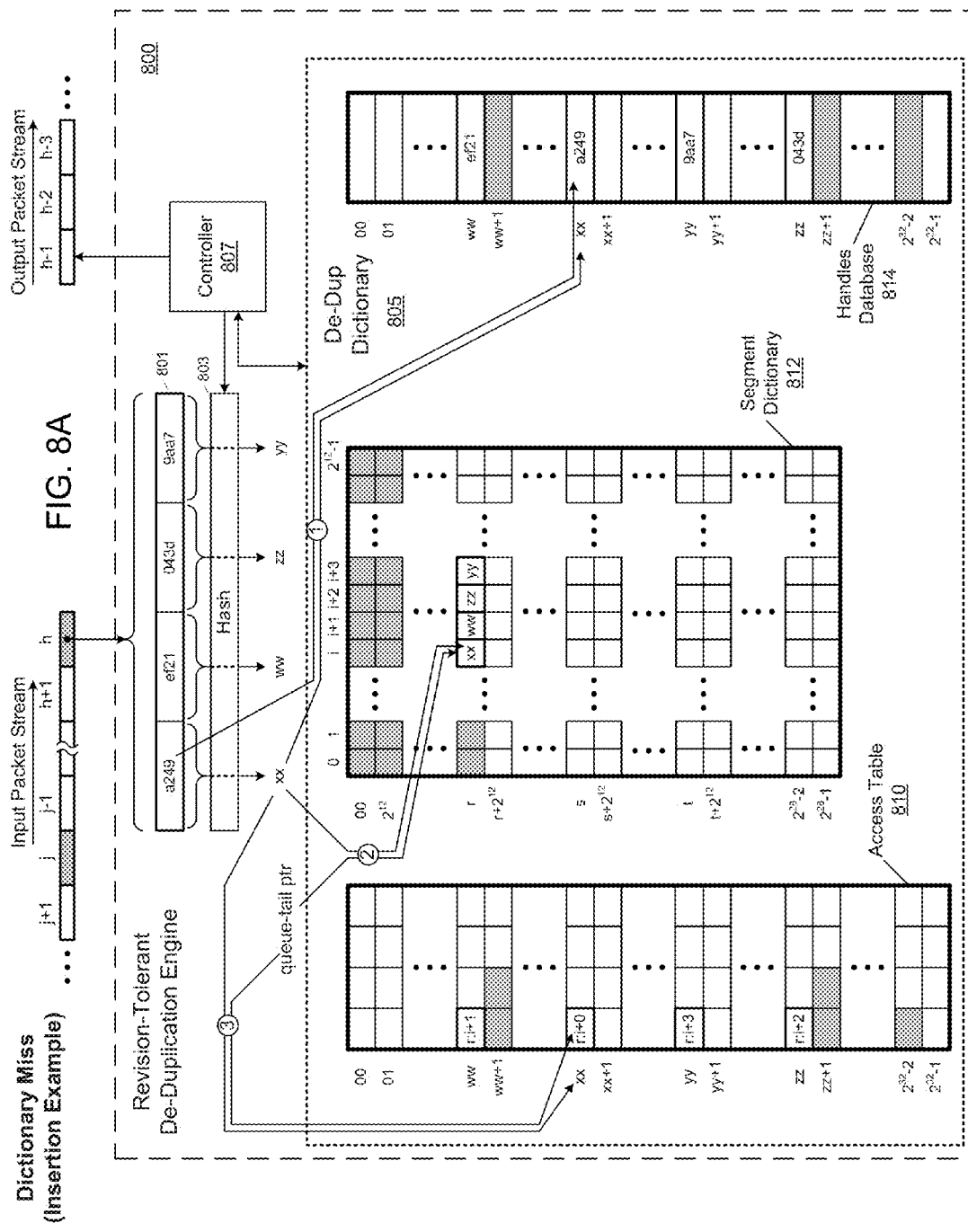

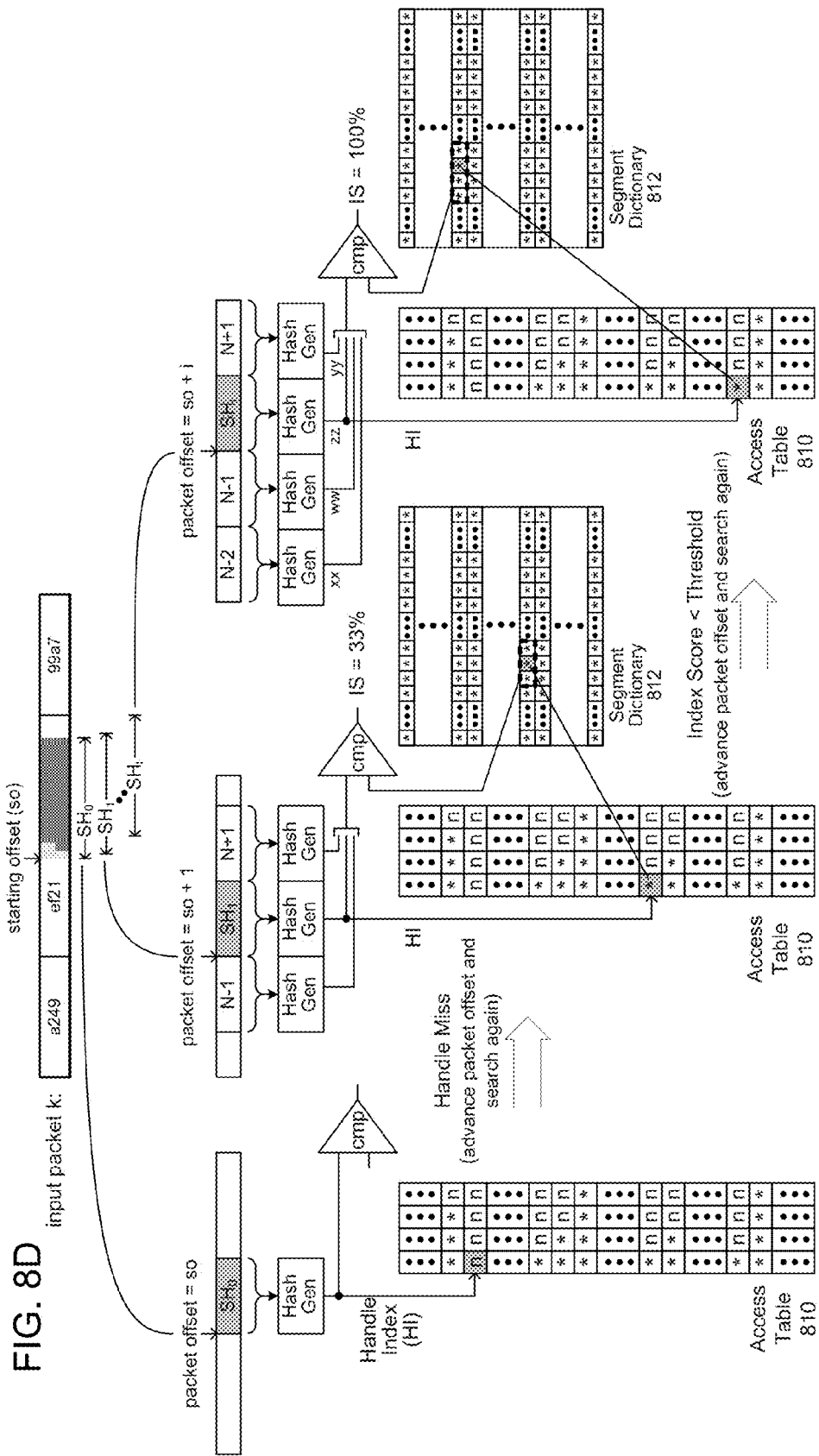

SPACE-EFFICIENT, REVISION-TOLERANT DATA DE-DUPLICATION

CROSS REFERENCE TO RELATED APPLICATIONS

This application is a continuation-in-part of U.S. patent application Ser. No. 12/495,432 filed Jun. 30, 2009 now U.S. Pat. No. 8,370,309 (entitled "Revision-Tolerant Data De-Duplication"), which claims priority to U.S. Provisional Patent Application No. 61/078,324 filed Jul. 3, 2008, and to U.S. Provisional Patent Application No. 61/092,740 filed Aug. 28, 2008, respectively. U.S. patent application Ser. No. 12/495,432 and U.S. Provisional Patent Application Nos. 61/078,324 and 61/092,740 are hereby incorporated by reference.

TECHNICAL FIELD

The disclosure herein relates to data processing and more particularly to reducing transfer and/or storage of redundant data in a data processing system.

BACKGROUND

The amount of data being stored and transmitted in modern data processing networks is growing rapidly as Web 2.0 technologies and content-rich media proliferate. Increasing employee mobility and rising capabilities of end user systems (e.g. laptops, smartphones) also increase the demand for content storage and transmission, as do disaster recovery and enterprise globalization technologies, which frequently involve distribution of multiple copies of data over large geographical areas. At the same time, the cost and operational expense of maintaining network links and large pools of storage devices remains high.

A number of technologies have emerged to address the explosive demand for network bandwidth and storage capacity, including data reduction techniques such as caching, compression and de-duplication. Data de-duplication is of particular interest and involves dictionary-based reduction of extremely large volumes of data (e.g., terabytes or more) into smaller quantities of stored or transmitted data.

FIG. 1 illustrates a prior-art de-duplication engine 100 that produces a de-duplicated output data volume, Y, in response to an input data volume, X. Following the conventional approach, breakpoints are identified within the input data volume based on the data content itself, thereby dividing the input data volume into multiple content-defined segments. A hash index is computed for each segment and compared with the contents of a hash table. If a matching hash index is found within the table, a dictionary segment pointed to by the matching hash table entry is retrieved and compared byte for byte with the input data segment. If the dictionary segment and input data segment match, then a token associated with the dictionary segment is inserted into the output data volume in place of the input data segment, thus reducing the output volume relative to the input volume (if the segments do not match or no matching hash index is found, the input data segment may be added to the dictionary and the corresponding hash index added to the hash table to effect a dictionary update). A converse operation is performed at the transmission destination (or upon retrieval from mass storage media), indexing the dictionary using the token (a matching dictionary is maintained at the destination) to restore the original data segment within a recovered data volume.

One substantial drawback of the foregoing de-duplication scheme is the intensive computation required to identify the breakpoints and hash index. In a typical implementation, a "fingerprint" is computed for each byte of the input data volume—a calculation that generally involves a polynomial division over a range of data extending from the byte of interest—to determine whether the subject byte constitutes a breakpoint (e.g., fingerprint meets some predetermined criteria, such as '0's in some number of bit positions). The hash index computation is similarly carried out for each byte of the input data volume and may similarly involve a relatively compute-intensive calculation. In general, the breakpoint identification and hash index computation are so demanding as to render the de-duplication operation impractical for high-bandwidth streaming data, thus requiring the data de-duplication operation to be executed offline for many important classes of applications.

The conventional approach is further plagued by dictionary "misses" that result from minor data modifications. Changing even a single byte within a segment will generally yield an entirely different hash index and thus a miss within the hash table (or worse, a hit within the hash table followed by a miss in the bytewise compare). Even more problematic is a modification within the region that produced a breakpoint in the original input data volume as the resulting breakpoint loss will cause a dictionary miss for both of the segments previously delineated by the breakpoint (i.e., one segment ended by the breakpoint and another segment begun).

BRIEF DESCRIPTION OF THE DRAWINGS

The disclosure herein is illustrated by way of example, and not by way of limitation, in the figures of the accompanying drawings and in which like reference numerals refer to similar elements and in which:

FIGS. 3A-3C illustrate operation of a revision-tolerant de-duplication engine in the context of a specific example;

FIGS. 8A-8G illustrate exemplary operations within a revision-tolerant de-duplication engine implemented in accordance with the general principles and features described in reference to FIGS. 6, 7A and 7B;

DETAILED DESCRIPTION

Data de-duplication techniques that detect and account for positionally shifted content resulting from data insertion and deletion and thereby enable efficient data-de-duplication without requiring computationally-intensive content-based data segmentation are disclosed in various embodiments. In particular, by detecting and accounting for positionally shifted content, it becomes possible to apply content-independent segmentation (partitioning) of an input data volume, entirely avoiding the intensive computation of content-based breakpoints employed by prior-art techniques and thereby enabling on-demand de-duplication within streaming media and other important applications. Further, because dictionary hits may be detected even in the face of insertions and deletions, improved data reduction may be achieved.

Figure 1:
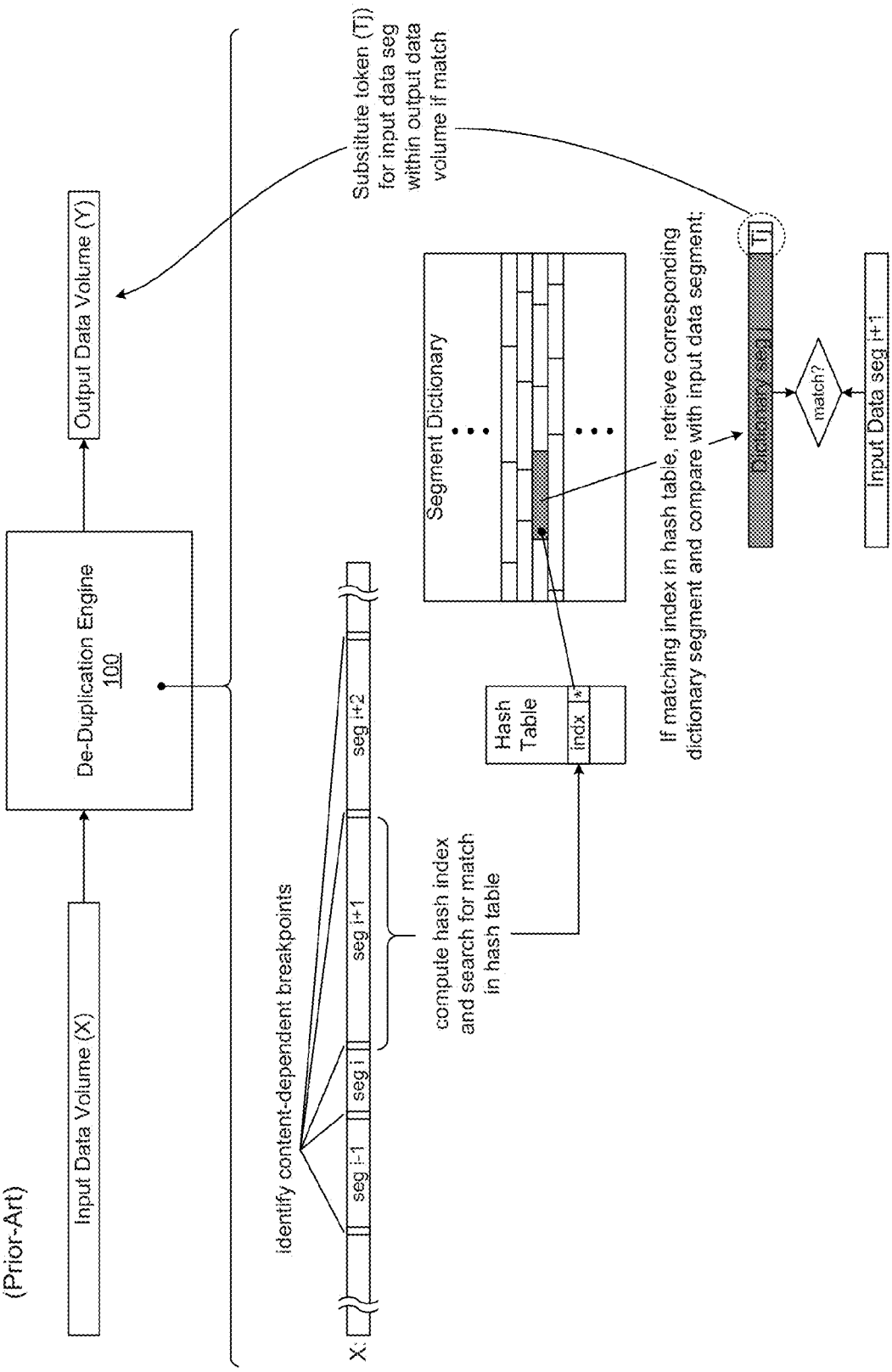
FIG. 1 illustrates a prior-art de-duplication engine.
Figure 2:
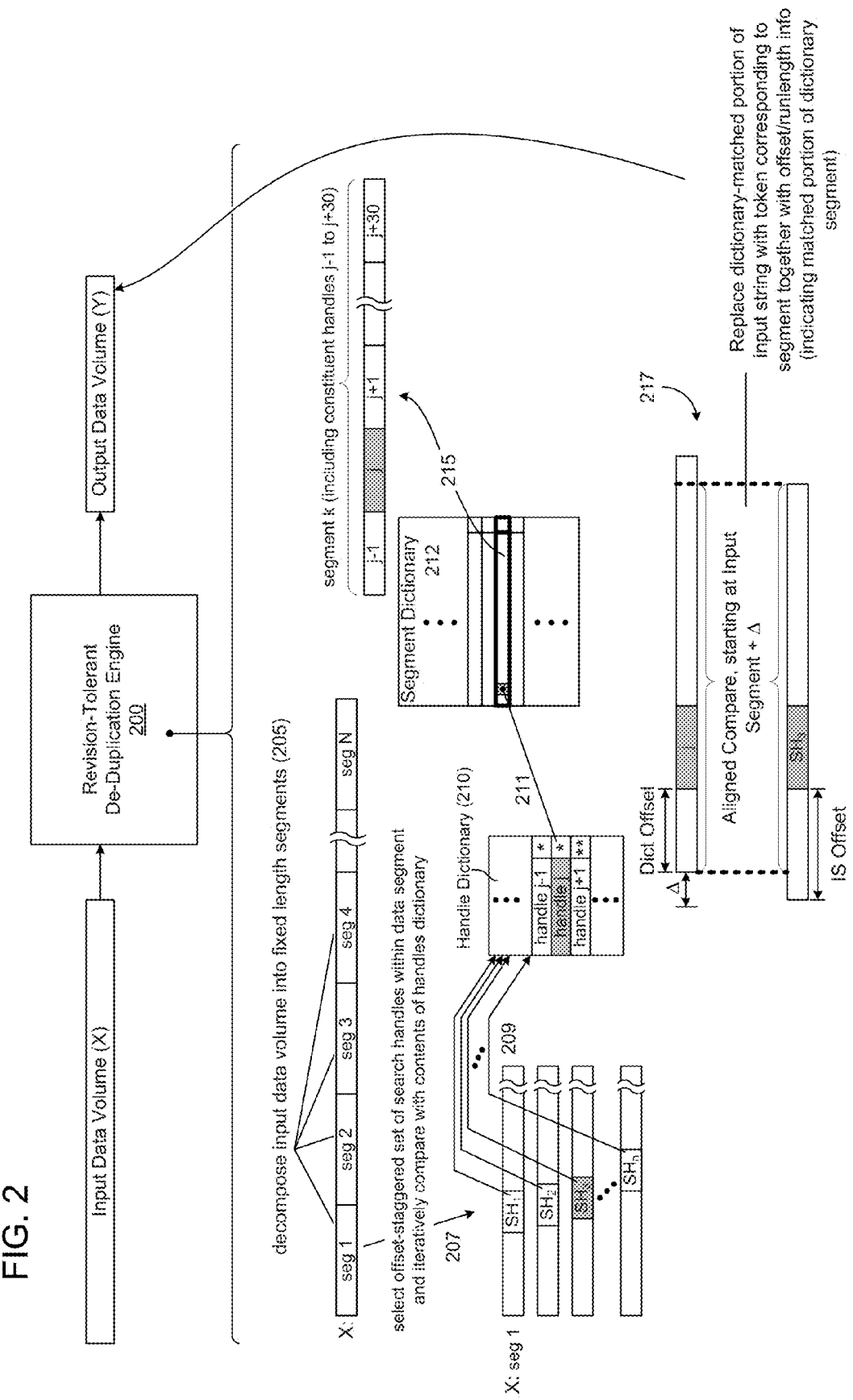
FIG. 2 illustrates an embodiment of a revision-tolerant de-duplication engine.

FIG. 2 illustrates an embodiment of a revision-tolerant de-duplication engine 200 that may be employed within a network appliance, data storage system or any other system that may benefit from reduced transfer or storage of redundant data. In the embodiment shown, the de-duplication engine 200 decomposes an input data volume X into fixed-length segments as shown at 205 and then carries out dictionary-based, revision-tolerant de-duplication with respect to each segment to produce a reduced-size output volume, Y. To enable this operation, the de-duplication engine first populates a two-part de-duplication dictionary with the contents of cold segments (i.e., segments that yield dictionary "misses"), storing each cold segment in a segment dictionary 212 (a first component of the de-duplication dictionary) and storing pointers to fixed-length subsegments of the cold segment in a segment-lookup dictionary 210. The fixed-length subsegments are referred to herein as handles and thus the segment-lookup dictionary referred to as a handle dictionary 210. In one embodiment, each handle is stored within the handle dictionary along with a pointer to each instance of that handle within the segment dictionary as shown at 211. Alternatively, instead of storing the handle itself within the handle dictionary, a hash value that may be deterministically computed from the handle may be stored within the handle dictionary along with the pointer(s) to the actual instances of the handle within the segment dictionary.

In either case, to search the dictionary for a given segment of input data volume X (also referred to herein as an input string), the de-duplication engine 200 selects an offset-staggered set of search handles within the data segment as shown at 207 and compares each search handle in turn (i.e., iteratively compares the search handles) with the contents of the handle dictionary (shown at 209) until either a matching handle is detected or all the search-handles are determined to miss (i.e., have no match within) the handle dictionary. In the specific example shown in FIG. 2, search handles, $SH_1$-$SH_n$, are retrieved from progressively incremented byte offsets within the first segment of the input data volume (i.e., byte-offset-staggered search handles) and compared with the contents of the handle dictionary 210 until a match is detected; in this example, a match for search handle, $SH_3$. The de-duplication engine 200 then references the pointer associated with the matching handle-dictionary entry (pointer '*' for handle j in this example as indicated by the shaded handle entry) to retrieve a dictionary segment (i.e., data segment from the segment dictionary) containing the search handle. For purposes of illustration, the retrieved segment 215 is assumed to contain 32 handles shown by handle indices j−1 to j+30, and the pointer itself is structured to include (or enable determination of) the base address of the segment and the offset of the matching handle (handle j) within the retrieved dictionary segment. Because the offset of the matching handle within the dictionary segment is known (or determinable), and the offset of the search handle within the input data segment is also known (i.e., search handle $SH_3$ is offset by the starting offset of initial search handle, $SH_1$, plus the offset between $SH_3$ and $SH_1$—the starting offset of $SH_1$+2), the two segments may be bytewise aligned according to the difference between their offsets. That is, even if a data insertion has occurred at the beginning of the input data segment (or in a preceding segment) in a manner that results in a positional shift, the offset-staggered handle search will not only enable detection of matching portions of the input segment and a corresponding dictionary segment, but will enable determination of the relative offsets between those matching portions and their respective segment-start locations. Consequently, the misalignment between the input segment and dictionary segment (Δ) may be used to enable an aligned comparison of the two segments—a bytewise comparison of the segment contents starting at an offset within one of the segments that accounts for the misalignment between their matching handles. This operation is illustrated at 217 by the comparison of the overlapping portions of the segments after being aligned by their handles. Note that a number of bytes (i.e., those not included within the overlapping region) are excluded from the comparison according to the handle misalignment value, Δ, at either end of the two segments. Further, in one embodiment, the de-duplication engine not only determines whether all the bytes of the overlapping portions of the segments match, but the specific number of matching bytes, thereby enabling an encoding and data reduction even in the event that the two overlapping segments only partially match. As discussed below, the approach described thus far may be applied recursively (potentially using progressively smaller handles) to encode multiple discontiguous matching portions of the input segment and one or more dictionary segments. Upon concluding the comparison operation at 217, the de-duplication engine encodes the match by inserting, within the output data volume, a token representative of the dictionary segment and information identifying the specific portion of the dictionary segment determined to match all or part of the input segment in place of the matched (and therefore redundant) portion of the input string. A converse operation may be applied within a recipient system (or upon data retrieval) to restore the original data in response to the segment-specifying token and segment portion identifier.

FIGS. 3A-3C illustrate operation of a revision-tolerant de-duplication engine in the context of a specific example. More specifically, FIG. 3A illustrates population of a two-part de-duplication dictionary in response to a sequence of cold segments within an exemplary input data string, while FIGS. 3B and 3C illustrate encoding operations that apply the populated dictionary. For purposes of example only, individual data elements and offsets therebetween are assumed to exhibit byte granularity and the segment size and handle size are assumed to be 32 bytes and 8 bytes, respectively. In practice, larger segment and handle sizes are generally applied. For example, in one embodiment, the segment size is set to 1 kilobyte and handle size to 32 bytes. More generally, any practical segment size and handle size may be applied and such sizes may be predetermined, operator-specified (e.g., through configuration settings within an appliance or programmable device) or adaptively/heuristically determined based on data content or other information available during system operation. Similarly, instead of byte granularity and/or offsets, word granularity/offsets of any number of bits may be used. Also, while text-based examples are shown in FIGS. 3A-3C, this is for ease of understanding only. The approach described is equally applicable to unconstrained binary data.

Turning to FIG. 3A, the following input string is received and decomposed into a sequence of 32-byte segments $301_1$-$301_3$ which are stored in the segment dictionary:

Here is an Example of How the Problems Associated with Fixed Length Segments for Deduplication are Solved Thereafter, each segment within the segment dictionary is decomposed into four 8-byte handles and the handles (or a hash index corresponding to same) are stored in the handle dictionary along with a pointer to the corresponding handle within the segment dictionary. Thus, for the three complete 32 byte segments of the input string, twelve corresponding handles and handle pointers are stored within the handle dictionary. Note that while the dictionary population is shown with the segments and handles populating adjacent rows of the segment dictionary, this may not be the case in ordinary practice. Also, each of the handles may additionally point to one or more other segments within the segment dictionary (e.g., handle pointer implemented as linked list of pointers to segments that contain the same matching handle).

FIG. 3B illustrates an exemplary application of the now populated de-duplication dictionary to encode an input string. In this particular example, the input string matches the string used to populate the dictionary (i.e., the recorded string), except that a new byte "T" has been inserted at the beginning of the string, thus yielding a positional displacement (shift) that changes the net content of every segment relative to the segments of the recorded string. As this example makes clear, hashed segment by segment comparison as used in prior-art approaches would yield a miss in every segment, despite the relatively minor revision to the data (hence the rejection of content-independent partitioning in conventional de-duplication methodologies).

Starting with the first incoming segment ("THERE IS AN EXAMPLE OF HOW THE P"), the de-duplication engine iteratively selects search handles from byte-staggered locations within the segment and searches the handle dictionary for a match (321). In this case, a relatively centered position within the input segment is selected (i.e., (segment length–handle length)/2–1=11) as the starting byte offset and a number of byte-staggered search handles corresponding to the handle length (i.e., 8 search handles) are selected starting from byte positions 11 ("N EXAMPL"), 12 ("EXAMPLE "), 13 ("EXAMPLE "), 14 ("XAMPLE O"), 15 ("AMPLE OF"), 16 ("MPLE OF "), 17 ("PLE OF H") and 18 ("LE OF HO") and compared with the contents of the handle dictionary. As discussed above, a hash index may be computed for each search handle and compared with a like-computed index stored within the handle dictionary, instead of populating the handle dictionary with complete handles as shown in FIG. 3A.

Continuing with the de-duplication shown in FIG. 3B, of the eight search handles, the last one "LE OF HO", is found in the handle dictionary. Accordingly, as shown at 323, the segment pointed to by the matching handle ("HERE IS AN EXAMPLE OF HOW THE PR") is retrieved from the segment dictionary. The dictionary segment and input segment are aligned based on the difference between the offset of the matching search handle within the input segment and the dictionary segment. That is, "LE OF HO" occurs at position 18 within the input segment (a value immediately available to the de-duplication engine as the starting position, 11, plus search handle number, 8, minus one) and at position 17 within the dictionary segment (handle pointer-base segment pointer), so that a handle misalignment of +1 is determined. Accordingly, as shown at 325, an aligned comparison may be carried out by comparing each byte of the dictionary segment up to segment length minus handle-misalignment value (1 in this example) with each byte of the input segment starting at one byte past the misalignment value. That is, bytes 1-31 of the dictionary segment are compared with bytes 2-32 of the input string. In the case of a negative misalignment value, application of the misalignment value to the beginning and end of the input segment and dictionary segment is reversed.

Continuing, in the example of FIG. 3B, all compared bytes of the handle-aligned segments match. Accordingly, as shown at 327, the matching bytes may be encoded by the token of the dictionary segment, and information indicating the sequence of contiguous matching bytes. In the embodiment shown, for example, the dictionary segment may be represented by token T1 (a much smaller unit of data than the data segment itself), start position 1 and run-length value 31 (note that start position and stop position may alternatively be used to encode the length of the matching byte sequence). Overall, the input segment is encoded by the unmatched string portion resulting from the misalignment, or <"T"> in this example), and the segment portion encoding, <T1, 1, 31>, and thus may be replaced in the output data volume by <"T"><T1,1,31>. At this point, as shown at 329, the entire handle-search, aligned-compare and encoding may be executed for the next input segment or, in the event that the total number of unmatched bytes in the current segment is less than a predetermined (or programmed or adaptively determined) threshold, another handle-search, aligned-compare and encoding may be carried out with respect to the unmatched portion of the current segment.

FIG. 3C illustrates another exemplary encoding of an input string using the de-duplication dictionary of FIG. 3A. In this particular example, the input string matches the recorded string except that string portion "HOW" has been deleted, yielding a positional displacement (shift) that changes the net content of every segment relative to the segments of the recorded string. Again, hashed segment by segment comparison as used in prior-art approaches would yield a miss in every segment, despite the relatively minor revision to the data.

Starting with the first incoming segment ("HERE IS AN EXAMPLE OF THE PROBLE"), the de-duplication engine iteratively selects search handles from byte-staggered locations within the segment and searches the handle dictionary for a match (341). Again, a relatively centered position within the input segment is initially selected (i.e., (segment length–handle length)/2–1=11) as the handle-search anchor (i.e., starting byte offset) and a number of byte-staggered search handles corresponding to the handle length (i.e., 8 search handles) are thus selected starting from byte positions 11 ("EXAMPLE "), 12 ("EXAMPLE "), 13 ("XAMPLE O"), 14 ("AMPLE OF"), 15 ("MPLE OF "), 16 ("PLE OF T"), 17 ("LE OF TH") and 18 ("E OF THE") and compared with the contents of the handle dictionary. In this case, none of the eight search handles finds a match in the handle dictionary. Accordingly, in the embodiment shown, the offset-staggered handle search is repeated at 343 starting at a different handle-search anchor within input segment; in this case toward the start of the input segment at position 2 (note that any progression to any number of different handle-search anchors may be used, including operator-programmed or adaptively determined progressions or a purely randomly-generated sequence of positions). Using the new anchor, search handles are selected starting from the anchor byte position: 2 ("ERE IS A"), 3 ("RE IS AN"), 4 ("E IS AN "), 5 ("IS AN E"), 6 ("IS AN EX"), 7 ("S AN EXA"), 8 ("AN EXAM") and 9 ("AN EXAMP"). Of these, the last one "AN EXAMP", matches a handle in the handle dictionary (or yields a hash index that matches a hash index in the handle dictionary). Accordingly, the segment pointed to by the handle dictionary entry is retrieved as shown at 345 and an aligned comparison carried out as shown at 347. In this case, the handle misalignment is zero as the matched handle occurs at the same byte offset (9) within the input segment and dictionary segment. Accordingly, the aligned comparison is carried out starting at the first byte of both segments. As shown at 348, the segments are determined to match through byte position 22, and to mismatch in byte position 23 ("H" not equal to "T"). Because of the provision of run-length information in the segment encoding, the matching portions of the segments may be encoded and used to effect data reduction even though the two segments do not entirely match (contrast prior art approaches in which only whole-segment matches are encoded). Accordingly, the matching byte sequence is encoded at 349 as <T1, 1, 22> (i.e., first 22 bytes of segment corresponding to token T1) and substituted (within the output data volume) for the first 22 bytes of the input segment.

Continuing with FIG. 3C, the number of unmatched bytes of the input string is determined to exceed a threshold that results in an iterative de-duplication effort at 351. In this iteration, the ten contiguous unmatched bytes of the input string are used as the input source and a handle-search is carried out starting at a relative midpoint offset 4 (e.g., handle search anchor determined by dividing the search byte count by two, minus one). Note that the search handle size remains unchanged despite the smaller input source. In alternative embodiments, the handle size may be reduced or scaled according to input source size.

Continuing with the example of FIG. 3C, one of the search handles ("OBLEMS A") matches a handle within the handle dictionary and is thus used to retrieve the corresponding dictionary segment. The handle misalignment value (offset of input source within original input string+difference between offsets of the matching handle within the input source and dictionary segment; −27 in this example) is used to carry out an aligned compare. The resulting match of the input source bytes and the last six bytes of the dictionary segment may thus be encoded as <T1, 27, 6> to indicate that the bytes "THE PR" are found in token T1 starting at byte offset 27 and continuing for six bytes. The overall encoding of the input segment with respect to the dictionary segment, T1, is thus <T1, 1, 22><T1, 27, 6>, "OBLE". The final bytes may subsequently be encoded as <T2, 1, 4>.

Figure 4:
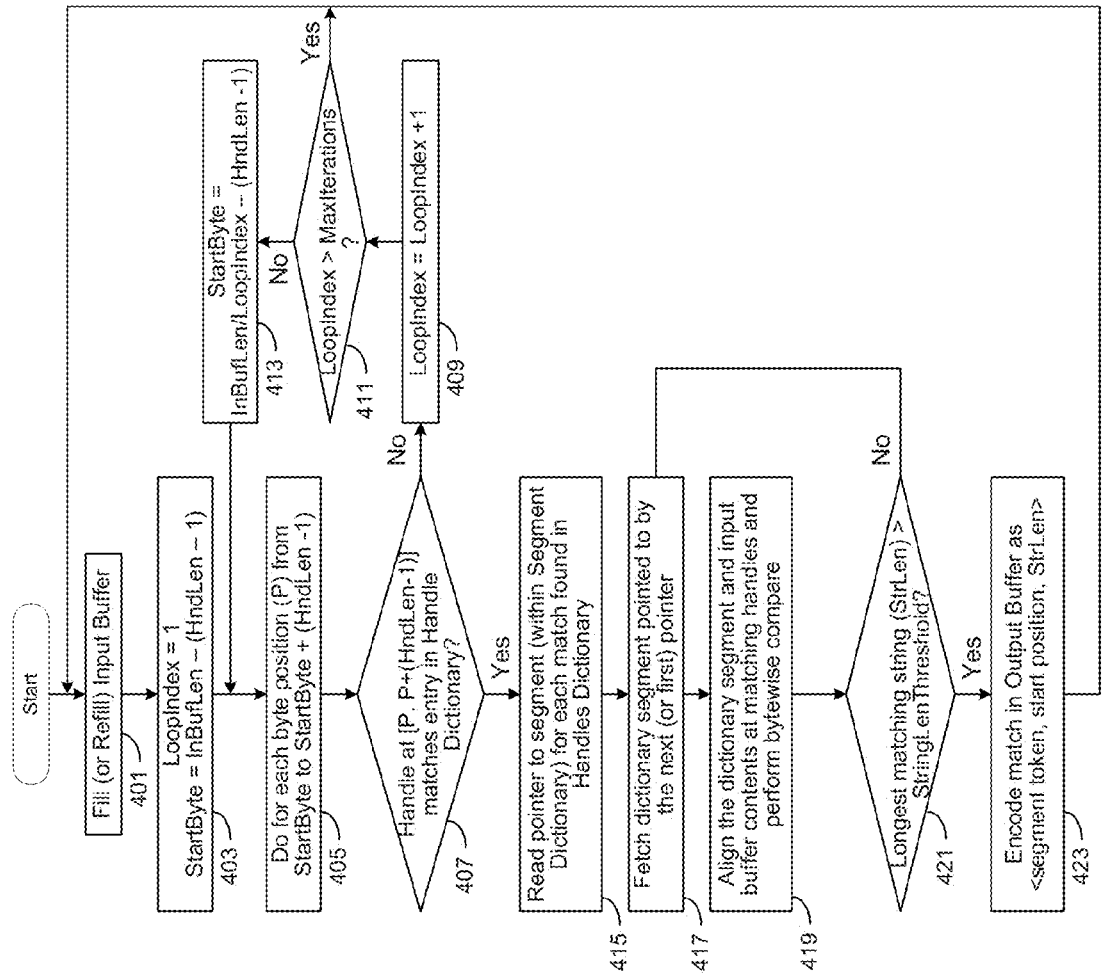
FIG. 4 illustrates a generalized flow diagram for the revision-tolerant data de-duplication described above.

FIG. 4 illustrates a generalized flow diagram for the revision-tolerant data de-duplication described above. Starting at 401, an input buffer is filled or refilled with the next fixed length segment to be de-duplicated, and at 403 a loop index (LoopIndex) is initialized to one and a startbyte index (i.e., search-handle anchor) is assigned to the end of the input buffer (InBufLen) less the handle length (HndLen) minus 1, thus providing headroom for advancing the search handle forward by one byte in as many as HndLen number of handle search operations.

At 405, a handle-search loop is started, starting with a search handle anchored at start byte and progressing in each loop iteration by one byte (up to StartByte+HndLen−1). Within the body of the loop, starting at decision 407, the search handle (i.e., handle at [P, P+HndLen−1]) is compared with the contents of the unmatched portion of the dictionary segment. If no match is detected (determined at 407), the loop index is incremented at 409 and checked against a maximum iteration value at 411. If the loop index does not exceed the maximum iteration value, the loop is repeated at 405 after setting a new StartByte value in 413. In the example shown, the StartByte value is assigned a value equal to the input buffer length divided by the loop index (less handle length minus 1 to provide headroom for the offset staggered handle-search); a heuristic that moves the StartByte progressively closer to the start of the input buffer in each loop iteration. Other approaches for adjusting the StartByte location may be used in alternative embodiments.

Returning to decision 411, if the loop index is determined to exceed the max iteration value, then the input buffer refilled at 401 and the sequence operations described thus far is repeated for the new input buffer content. Though not shown, prior to refilling the buffer at 401, the current buffer content may be used to populate the de-duplication dictionary (i.e., a dictionary miss has occurred) and inserted verbatim within the output data volume. Also, other types of encoding may be applied to reduce the buffer content prior to insertion within the output data volume.

Returning to decision 407, if the search handle matches one or more entries in the handle dictionary, the pointers for each matching entry are read from the handle dictionary at 415. At 417, a segment fetch loop is begun to fetch each dictionary segment corresponding to a matching handle in turn. At 419, the fetched dictionary segment and input buffer contents (i.e., input segment) are aligned based on the relative positions at which the matched handle appears in each, and a bytewise compare is executed. At 421, the longest matching string (i.e., sequence of contiguous bytes or other data elements) is compared with a string length threshold (StrLenThreshold). If the longest matching string is greater than the string length threshold, then the match is encoded within the output buffer (i.e., storage for all or portion of output data volume) by a token that corresponds to the dictionary segment, starting offset within the dictionary segment and value that specifies or enables determination of the length of the string (e.g., <segment token, start byte, StrLen> as shown at 423). After encoding at 423, execution is repeated starting with refilling the input buffer at 401.

Returning to decision 421, if the longest matching string does not exceed the string length threshold (which may be a fixed, programmable or adaptively determined value), the matching string is deemed too short to encode and execution proceeds from the start of the loop at 417 to fetch the dictionary segment pointed to by the next matching handle dictionary entry, if any.

Figure 5:
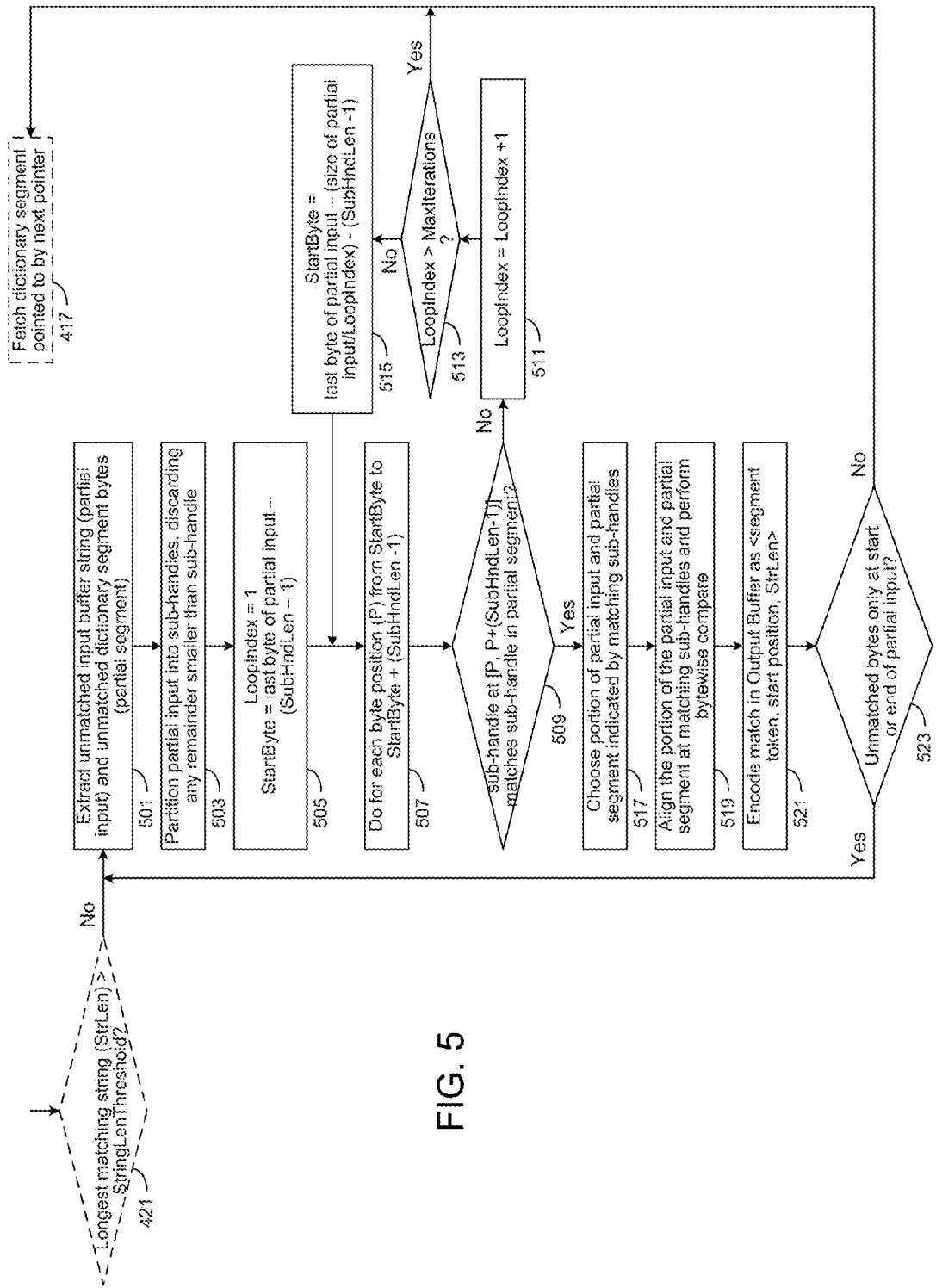
FIG. 5 illustrates an optional refinement of the generalized method shown by FIG. 4.

FIG. 5 illustrates an optional refinement of the generalized method shown by FIG. 4. More specifically, at decision 421, instead of returning directly to block 417 to fetch the next dictionary segment in response to a negative determination, a more refined search is carried out within the unmatched portion of the input buffer content. More specifically, at 501, the unmatched portion of the input buffer string (referred to herein as the partial input) and unmatched portion of the dictionary segment (the partial segment) are extracted from the input buffer and dictionary segment, respectively. At 503, the partial input is divided (or partitioned) into multiple sub-handles, discarding any remainder smaller than the sub-handle size. In one embodiment, for example, the sub-handle size is half the size of the original handle (or half the size of the next larger handle in the case of a hierarchy of handle sizes). At 505, a loop index is initialized to 1 and a search handle anchor (StartByte) set to the final byte of the partial input less the sub-handle size minus 1.

At 507, a search loop is begun to execute a sequence of offset-staggered sub-handle searches starting with the sub-handle at the handle anchor (StartByte) and advancing the sub-handle by one byte in each loop iteration. More specifically, each sub-handle is (i.e., sequence of sub-handles at [P, P+SubHndLen−1] where P is advanced by one byte SubHndLen number of times) is compared with the contents of the handle dictionary. If no match is detected (decision 509), the loop index is incremented at 511 and checked against a maximum iteration value at 513. If the loop index does not exceed the maximum iteration value, the loop is repeated at 507 after setting a new StartByte value in block 515. In the example shown, the StartByte value is offset from the end of the partial input by a number of bytes equal to the size of the partial input divided by the loop index (and less handle length minus 1 to provide headroom for the offset staggered subhandle-search), thus moving the StartByte progressively closer to the start of the partial input in each loop iteration. Other approaches for adjusting the StartByte location may be used in alternative embodiments. If the loop index is determined to exceed the max iteration value at 513, then execution proceeds to block 417 to fetch the dictionary segment pointed to by the pointer for the next matching entry in the handle dictionary, if any.

Returning to decision 509, if the sub-handle matches one or more sub-handles in the unmatched portion of the dictionary segment, the portions of the partial input and partial segment indicated by the matching sub-handles are selected at block 517 and an aligned compare executed at 519. That is, the portions of the partial input and partial segment are aligned at their matching subhandle and the overlapping region of each compared in a bytewise compare. A matching string, if any, is encoded and inserted within the output buffer as <segment token, start position, StrLen> as shown at 521. Finally, if the unmatched bytes are determined to occur only at the start or end of the partial input (determined in decision 523), then yet more unmatched bytes remain. In that case the refined search operation is repeated, starting at block 501 by extracting the remaining unmatched bytes from the input buffer string and dictionary segment. If the remaining unmatched bytes are not limited to the start or end of the partial input (negative determination at 523), then the next segment may be fetched at 417, or the input buffer reloaded at the top of the de-duplication loop.

It should be noted that the data de-duplication techniques disclosed herein are not restricted to segments of fixed length. Even when an alternate mechanism is used to determine the boundaries of segments in an input (using, for example, the fingerprint-based approaches in prior art), this method is equally applicable. In one embodiment, each variable length segment so determined can be further segmented into fixed length segments and each such fixed length segment is stored in the segment dictionary, with the corresponding handle dictionary. Then the handle search mechanism described in this invention is utilized within the variable length segment to identify pointers to the fixed length segments in the dictionary. These fixed length segments are fetched and then compared to the contents of the variable length segment by applying the alignment discussed above and the rest of the process carries over. One major specific advantage of this approach over the prior art on variable length segments is that partial matches can now be identified and more effective data de-duplication can thus be accomplished, in contrast to the prior art where an input segment either matches in its entirety with a dictionary segment or otherwise considered to have no match at all.

With respect to FIGS. 4 and 5 in particular, it should be noted that numerous alternative implementations and application-specific optimizations may be implemented without departing from the intended scope of the approach described. For example, multiple fixed-length segments (or a whole segment and a fraction of another) may be loaded into the input buffer instead of one segment at a time. In one embodiment, for example, approximately two full segments are retrieved and moved through the input buffer in pipelined fashion (i.e., each refilling of the buffer moves segment i into the buffer location previously occupied by segment i−1, and moves segment i+1 into the buffer location previously occupied by segment i). By this operation, a number of bytes of a subsequent segment may be encoded as part of a preceding segment. As another example, progressively smaller sub-handles may be used to effect a hierarchical handle search as the unmatched portion of a given input segment becomes progressively smaller. These and other changes are deemed to be entirely within the scope of the generally described embodiments.

As discussed in reference to FIG. 2, multiple instances of the same handle may be stored in the segment dictionary (e.g., as part of different segments) with multiple corresponding pointers stored within the handle dictionary. While this arrangement may be sufficient for many applications, handles that appear relatively frequently within the input data volume may be replicated hundreds or thousands (or more) times within the segment dictionary, substantially inflating dictionary size.

Figures 6, 7A:
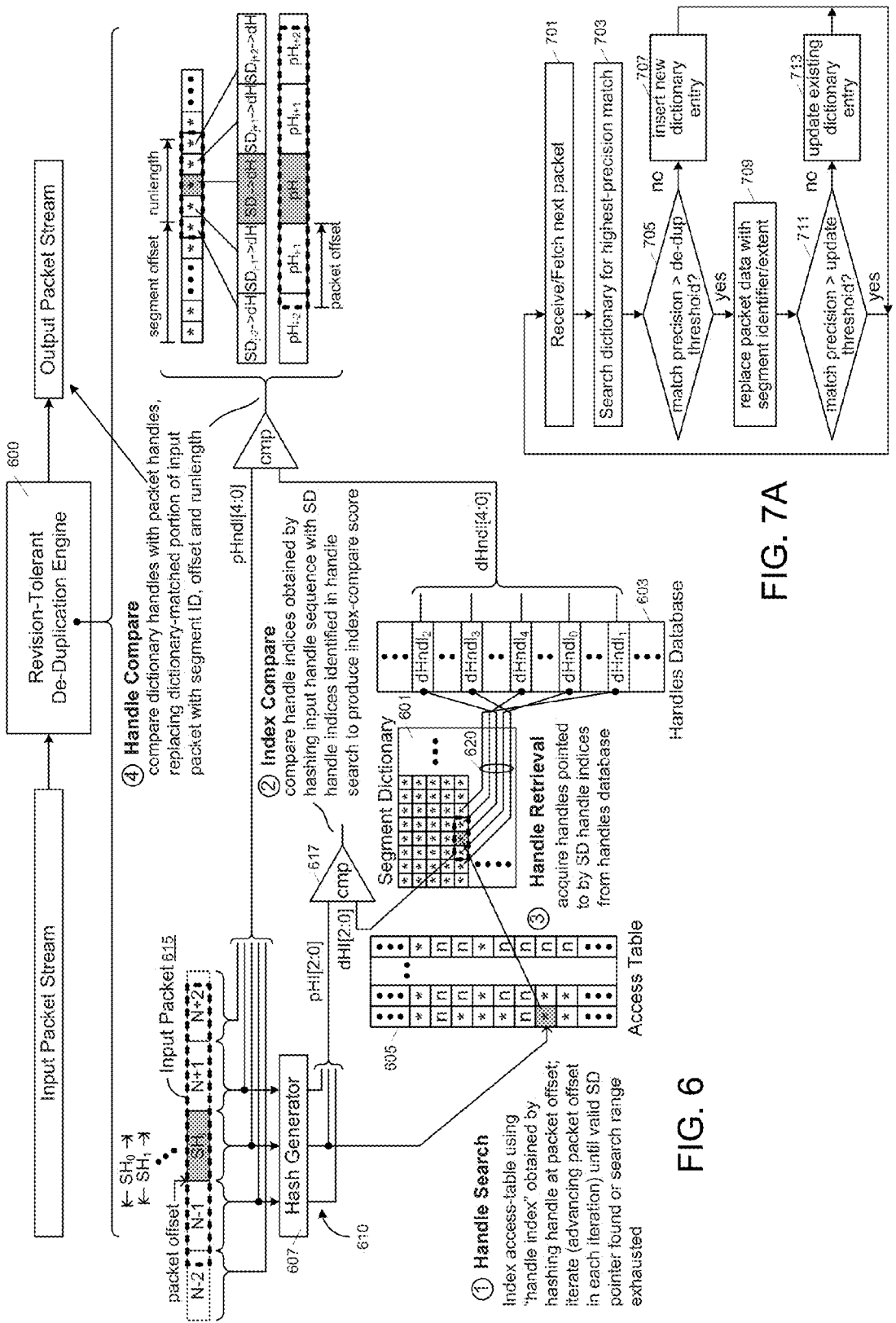
FIG. 6 illustrates an alternative embodiment of a revision-tolerant de-duplication engine having a potentially more compact and efficient dictionary architecture than the de-duplication engine of FIG. 2.
FIG. 7A illustrates an exemplary sequence of operations that may be carried out to de-duplicate an input packet stream using the revision-tolerant de-duplication engine of FIG. 6.

FIG. 6 illustrates an alternative embodiment of a revision-tolerant de-duplication engine 600 having a potentially more compact and efficient dictionary architecture than the de-duplication engine of FIG. 2. In general, instead of storing handles themselves in segment dictionary 601, more compact references (pointers) to those handles are stored, with each referenced handle being stored in a single instance within a separately accessible storage (or logically separated region of an integrated storage) referred to herein as the handles database 603. By this arrangement, a given handle value need only be stored once within the handles database 603 and then referenced as many times as necessary by handle pointers within segment dictionary 601, thus normalizing the handle storage. Assuming a 32-byte handle size and a handle database capable of storing $2^{32}$ handles (i.e., 4-byte handle pointer), an 8:1 storage compaction is achieved for each extra reference to a given handle as only 4 bytes need be stored instead of 32.

Handles may also be omitted from the handle-search architecture to further reduce dictionary size. In the embodiment of FIG. 6, for example, a hash-based lookup structure formed by access table 605 and hash generator 607 is provided to carry out the initial handle search instead of the handles dictionary shown in FIG. 2. The hash generator 607 produces hash values, also referred to herein as handle indices 610, corresponding to respective handles selected from a stream of incoming data (similar search-handle selection may be carried out with respect to data at rest) and pointers to dictionary instances of the handles are stored within access table 605 at locations specified by the handle indices. Thus, a search for a given input handle (i.e., a "search handle") may be carried out by generating the handle's index, then addressing the access table using the handle index to obtain a set of one or more pointers to segment-dictionary entries. Because each segment-dictionary entry is itself a pointer to a handle within handle database 603, a trail of pointers (segment dictionary pointer, then handle-database pointer) may be followed or de-referenced to obtain the underlying handle.

In one embodiment, handle indices are also leveraged to improve search efficiency. More specifically, by using the same hash-generated handle indices to address both access table 605 and handle database 603 (i.e., such that the segment dictionary entries are themselves handle indices), it becomes possible to compare handle indices produced by hashing the input packet stream with counterpart handle indices within the segment dictionary and thus determine handle-match probability before undertaking more resource-consumptive handle fetch/compare operations.

FIG. 6 depicts generalized phases of an exemplary de-duplication operation carried out using the index-based architecture, including a handle-search phase (1), index-compare phase (2), handle-retrieval phase (3), and handle-compare phase (4). In the handle-search phase, the de-duplication engine 600 iteratively searches an input packet 615 for a handle that yields a valid handle index. In the particular embodiment shown, for example, the de-duplication engine selects an initial "search handle" at a randomly (or algorithmically or heuristically) determined packet offset, hashes the search handle within hash generator 607 to obtain a handle index and then fetches a pointer collection from a storage location within the access table 605 specified by the handle index (i.e., the de-duplication engine addresses or indexes the access table using the handle index). If any of the pointers in the fetched collection is a valid segment-dictionary pointer, the search handle is deemed to "hit" the dictionary (i.e., deemed to be a valid handle to the de-duplication dictionary) and the de-duplication engine proceeds to the index comparison phase. Conversely, if none of the fetched pointers is valid (e.g., all null), the search handle is deemed to miss the dictionary and the de-duplication engine advances the packet offset (e.g., incrementing by a byte, though larger or smaller increments or decrements may be applied in alternative embodiments) and then repeats the handle search operation. Thus, in the example depicted in FIG. 6, de-duplication engine 600 advances through a sequence of invalid search handles ($SH_0$, $SH_1$, . . . ) until detecting a valid search handle at $SH_i$ at the packet offset shown.

In one embodiment, even after locating a valid search handle, the de-duplication engine may continue the handle-search phase (i.e., advancing the packet offset in each iteration) until a dictionary hit yields a sufficiently high index-compare score (discussed below) or until the packet offset has been advanced through a search window equal to the handle size (i.e., thus detecting dictionary-matched data despite bytewise data shift caused by data insertion/deletion). In another embodiment, all of the offset-staggered search handles framed by the search window are searched in parallel by a multi-ported handle-search engine, with the valid handles being differentiated in the index-compare phase to determine a final selection. In either embodiment (parallel or sequential handle-search), if no hit is found within an initially selected search window, one or more additional search windows may be selected and searched before concluding that the input packet misses the dictionary altogether.

In the index-compare phase (i.e., following a handle-search hit), a set of packet handle indices obtained from a validated search handle ($SH_i$) and its neighboring handles (N−1, N+1) is compared with a corresponding set of dictionary handle indices identified by the search handle. More specifically, the indices for a number of whole, consecutive handles (each pair of consecutive handles having a common boundary) within the input packet, including the validated search handle, are compared with a like number of consecutive indices within the segment dictionary, with the latter being indicated by the segment-dictionary pointer obtained in the handle-search phase. As a matter of terminology, the dictionary-hit search handle (i.e., the search handle that indexed to a valid segment dictionary pointer within the access table) is referred to herein as the "cursor" or "cursor handle," and the neighboring handles are referred to as precursor and postcursor handles according to whether they precede or succeed the cursor handle within the input packet. The segment-dictionary entry pointed to by the indexed access-table pointer is likewise referred to as the cursor index, and the neighboring indices as precursor and postcursor indices. The complete set of whole, consecutive handles within the input packet (i.e., occurring at byte offsets within the packet equal to PO+/−n*HS, where 'PO' is the packet offset, 'HS' is the handle size and 'n'=0, 1, 2, . . . ) is referred to as the handle sequence, and the corresponding set of indices yielded by hashing the handle sequence within hash generator 607 as the packet index sequence. In one embodiment, the numbers of precursor and postcursor handles in a given handle sequence are determined dynamically, according to the packet offset of the cursor. For example, the number of whole precursor handles spanned by the packet and thus the number of precursor indices may be obtained by dividing the number of bytes that precede the cursor by the handle size (i.e., PO/HS), and the number of whole postcursor handles and indices may similarly be obtained by dividing the number of bytes beyond the end of the cursor by the handle size (i.e., (PL−(PO+HS))/HS, where 'PL' is the packet length). In the particular embodiment shown in FIG. 6, the cursor ($SH_i$) is located at a packet offset that provides for one whole precursor handle, N−1, and one whole post-cursor handle, N+1, so that the handle sequence spans three handles. As discussed below, the fractional portions of precursor handle N−2 and postcursor handle N+2 are also spanned by input packet 615 and may be compared with dictionary data in the handle-compare phase.

Continuing with the index-compare phase, the three constituent handles of the handle sequence are hashed within the hash generator 607 (an operation that may be carried out in the handle-search phase) and the resulting packet index sequence (i.e., indices pHI[2:0]) is compared with the sequence of handle indices identified within the segment-dictionary (i.e., the dictionary index sequence) in the handle search. As mentioned, the number and relative positions of handle indices within the dictionary index sequence may correspond to the number and relative positions of the handles in the packet handle sequence, and thus include a cursor index (pointed to by the indexed access-table entry), one postcursor index and one precursor index. Thus, in the example shown, de-duplication engine 600 fetches (retrieves) a sequence of at least three dictionary handle-indices (i.e., dHI[2:0], including the precursor, cursor and postcursor indices) from the segment dictionary and compares the fetched dictionary index sequence with the packet index sequence, pHI[2:0], to produce an index-compare score. The de-duplication engine may include a dedicated compare-logic circuit (e.g., 617) to compare the two index sequences, or the comparison may be executed by a processor or other multi-functional circuitry.

In one embodiment, the index-compare score ("index score" for short) is determined based upon the number of exactly-matching indices within the packet and dictionary index sequences. In alternative embodiments, particularly where the hash value includes component values that correspond to fragments of a handle, partial matches between packet and dictionary handle indices may contribute to the index score.

In one embodiment, the index score for a given dictionary index sequence is compared with the highest search score yet obtained (i.e., scores produced in preceding index-compare iterations for the same input packet) and recorded, along with the corresponding segment dictionary pointer, to reflect the best index-compare result up to that point in the de-duplication operation. As discussed below, if the index-compare score for a given dictionary index sequence is above a high-precision threshold, de-duplication engine 600 may deem those indices to be the most correlated to the incoming packet and proceed to the handle-retrieval phase without further index-compare (or handle-search) iteration. If the index-compare score does not exceed the high-precision threshold, index comparison may be repeated with a dictionary index sequence pointed to by the next valid segment-dictionary pointer indexed by the current cursor handle, if any. In one embodiment, if the dictionary index sequence pointed to by the last of an search-identified set of segment-dictionary pointers yields an index score below the high-precision threshold (i.e., the index comparison has been repeated for each of the segment-dictionary pointers indexed by the current cursor handle without locating a dictionary index sequence that scores above the high-precision threshold), the de-duplication engine may proceed to the handle-retrieval phase with the dictionary index sequence that yielded the highest (or otherwise superlative) index score if the highest score exceeds a low-precision threshold. Otherwise, the de-duplication engine may deem the dictionary hit at the current cursor handle to be a false positive and revert to the handle-search phase, advancing the packet offset and executing one or more additional handle-search iterations. In one embodiment, if the handle search is concluded and at least one dictionary hit has been recorded, the corresponding dictionary index sequence that yielded the highest non-zero index score (i.e., at least some degree of index match) is deemed the best match and applied in the handle retrieval phase. Otherwise, if no dictionary hit occurs, or no non-zero index score is obtained, a dictionary miss may be signaled for the overall de-duplication operation.

In the handle retrieval phase, the de-duplication engine retrieves the handles pointed to by the dictionary index sequence identified in the handle-search/index-compare phases, as well as any handles pointed to by precursor/postcursor indices that correspond to fractional precursor/postcursor handles spanned by the input packet. In the particular embodiment of FIG. 6, for example, the input packet spans a fractional portion of precursor handle N−2 and a fractional portion of postcursor handle N+2, in addition to the cursor handle $SH_i$ and whole precursor/postcursor handles, N−1 and N+1. Thus, in the example shown, de-duplication engine 600 fetches five handles from the handle database in the handle retrieval phase: the three handles pointed to by the dictionary index sequence identified in the handle-search and index-compare phases, as well as the handles pointed to by segment dictionary entries displaced from the search-identified cursor index in accordance with the displacement of the fractionally-spanned packet handles relative to the cursor handle. The overall collection of dictionary indices dereferenced to fetch handles from the handle database (five indices and thus five handles in this example) is shown at 620.

In the handle-compare phase, de-duplication engine 600 performs a byte-by-byte comparison of the search-identified packet handles (i.e., the handle sequence identified in the handle-search and index-compare phases, and any remaining handles fractionally spanned by the packet) with the dictionary handles retrieved from the handle database in the handle-retrieval phase, replacing the dictionary-matched portion(s) of the input packet with information that indicates the segment, segment offset and run-length information corresponding to the matching dictionary data. In the example of FIG. 6, for instance, each of the search-identified handles (depicted as cursor handle, pHi, precursor handles pHi−1 and pHi−2, and postcursor handles pHi+1, pHi+2) is determined to exactly match a corresponding handle fetched from the handles database, in the relevant portion spanned by the packet (i.e., fractional portions of pHi−2 and pHi+1, and entire portions of the remaining search-identified handles). Accordingly, the packet may be represented by a value that specifies the segment dictionary entry in which the identified sequence of handle indices occurs (i.e., segment containing handle indices at entries $SD_{j-2}$, $SD_{j-1}$, $SD_0$, $SD_{j-1}$, $SD_{j+2}$, where 'SD,' is a segment dictionary entry offset by 'i' entries from the entry containing the cursor index, and $SD_i \rightarrow dH$ is the dictionary handle pointed to by the index at $SD_i$), the byte offset of the first matching packet byte relative to the dictionary handle sequence pointed to by dictionary handle indices (i.e., start of handle pointed to by the index at $SD_{j-2}$+(HS−(PO mod HS)), where 'mod' is the modulus operator and thus yields an integer remainder of the packet offset divided by the handle size), and the run-length of the match which, in this case, is the length of the packet. In other instances, discussed below, more limited portions of the search-identified dictionary handles may be determined to match corresponding portions of the input packet, including disjointed groups of matching bytes. In such embodiments, the match encoding may be expressed by more limited run-length information and multiple segment offsets and run-lengths corresponding to the disjointed (i.e., non-contiguous) portions of the input packet determined to match the dictionary contents.

FIG. 7A illustrates an exemplary sequence of operations that may be carried out to de-duplicate an input packet stream using the revision-tolerant de-duplication engine of FIG. 6. At 701, the next (or first) packet to be de-duplicated is fetched or received. In one embodiment, for example, the de-duplication engine is implemented within a network appliance through which packet traffic flows. In an alternative embodiment, the de-duplication engine may operate on a data volume stored in a mass storage device (or other data at rest), fetching packets (or other units of data) one after another (or in groups) for de-duplication.

At 703, the de-duplication engine searches the de-duplication dictionary for the highest-precision match. If the match precision fails to exceed a minimum de-duplication threshold (i.e., negative determination at decision 705), the packet is deemed to miss the de-duplication dictionary altogether and may be inserted into the dictionary as shown at 707. If the match precision exceeds the minimum de-duplication threshold, the packet data is replaced with (i.e., encoded by) segment identifier and extent information as shown at 709 (e.g., segment ID, segment offset and run-length information as discussed above). The match precision (or other information such as extent of encoding) may also be compared with an update threshold as shown at 711, to determine whether a dictionary update is warranted. For example, if the match precision does not exceed the update threshold, the dictionary entry that yielded the below-threshold match precision may be updated as shown at 713 to reflect differences with respect to the packet data and thus enable more precise matching of later-received instances of the same or similar packets.

Figure 7B:
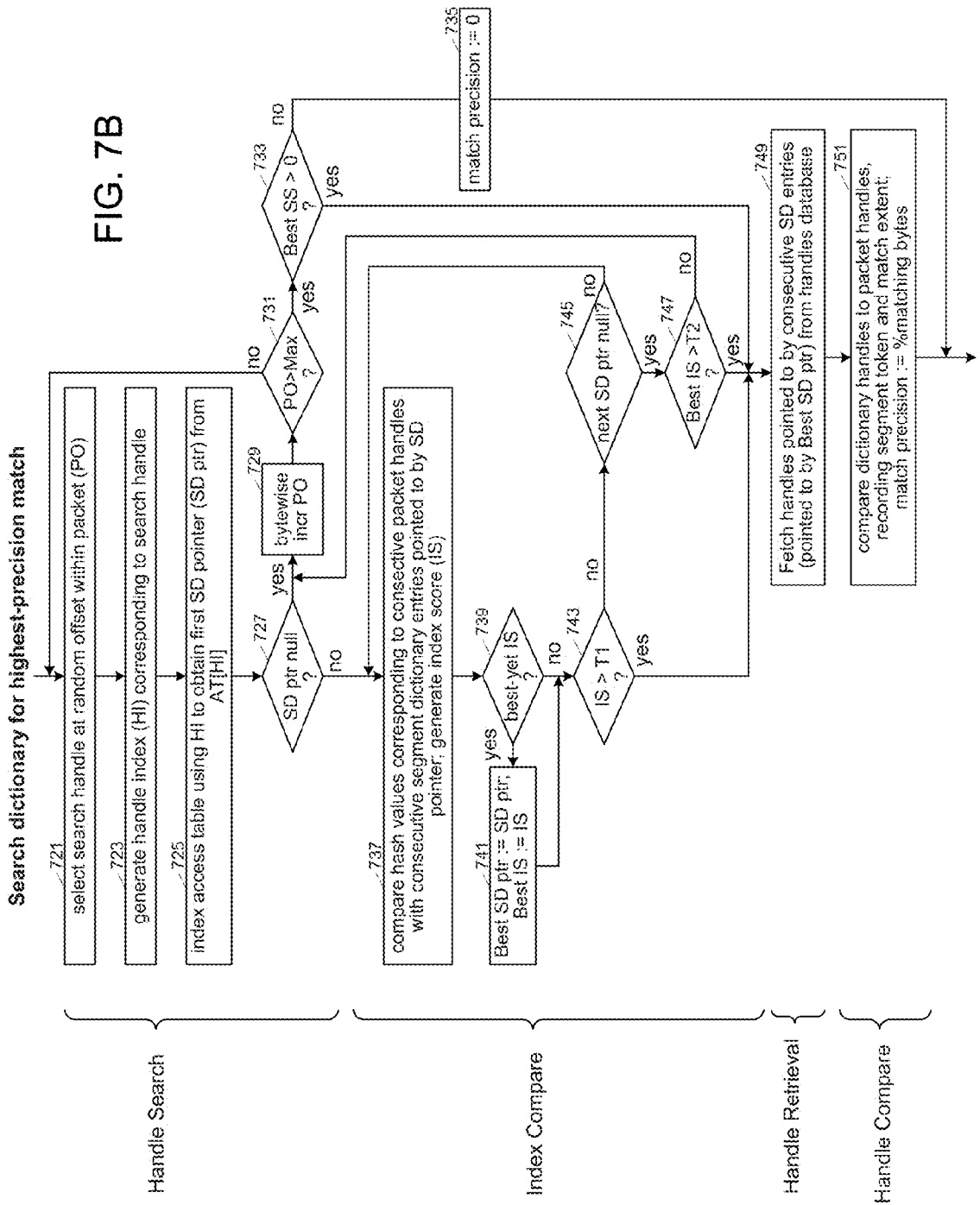
FIG. 7B illustrates an exemplary flow diagram of the dictionary search operation referenced in of FIG. 7A.

FIG. 7B illustrates an exemplary flow diagram of the dictionary search operation referenced in block 703 of FIG. 7A in the context of the handle-search, index-compare, handle-retrieval and handle-compare phases of the de-duplication operation described above. Starting at 721 in the handle-search phase, a search handle is selected from a randomly (or algorithmically or heuristically) determined packet offset, and thus forms the cursor handle for an iteration of the handle-search operation. As discussed below, the packet offset may be constrained to ensure that a search window equal to approximately twice the handle size may be reached by advancing (incrementing or decrementing) the packet offset through as many as HandleSize−1 incremental byte offsets. Also, the packet offset for a given handle-search iteration may be used to determine the number of whole and fractional precursor and/or postcursor handles to be applied in later phases of the de-duplication operation.

Still referring to FIG. 7B, the de-duplication engine generates a handle index (HI) at 723 (e.g., by hashing the search handle selected at 721), and applies the handle index to address (or index) the access table at 725 and thus obtain a collection of segment dictionary pointers. In one embodiment, the access table includes storage for an array of four segment-dictionary pointers, SDptr[3:0], at each addressable storage location, so that the access-table entry indexed a given handle index may point to as many as four different segment dictionary locations (more or fewer pointers may be provided per table entry in an alternative embodiment, and a variable-capacity structure such as a linked list may alternatively be employed). Further, the access table may be managed such that any valid pointers appear before null pointers (invalid pointers) within the array so that the pointer-storage elements that form a given access table entry may be traversed in linear order until a null pointer is found. Accordingly, if the first segment-dictionary pointer (e.g., SDptr[0]) is determined to be null at 727, then the index handle generated at 723 is deemed to miss the access table (and thus miss the dictionary). Consequently, the packet offset is incremented at 729, confirmed to be less than the last packet offset in the search window at 731, and then another iteration of the handle search operation repeated starting at 721.

If the segment-dictionary pointer evaluated at 727 is not null, then at 737 within the index-compare phase, the packet index sequence (i.e., the index of the cursor handle, plus the indices of any whole precursor and/or postcursor handles, which may be generated in parallel as part of operation 723, or sequentially) is compared with the dictionary index sequence pointed to by the segment-dictionary pointer. The resulting index score (e.g., an indicator of the number of exactly matching indices between the dictionary and packet sequences) is evaluated at 739 and, if determined to be the best index score up to this point in the search, the segment dictionary pointer is recorded as the best-yet pointer ("Best SD ptr") and the index score is recorded as the best-yet index score ("Best IS") as shown at 741. In one embodiment, the best-yet index score is initialized to the lowest possible score or to a predetermined code to indicate invalidity, in either case ensuring that any index score above the lowest-possible score is recorded as the best yet at 741.

Continuing with the exemplary search approach shown in FIG. 7B, the index score is compared with a high-precision threshold, T1, in decision block 743 to determine if a high-precision match (e.g., all indices match between the two index sequences, or a substantial portion of the indices match). If the index score exceeds the precision threshold, the de-duplication engine proceeds to operation 749 within the handle-retrieval phase to fetch handles from the handles database pointed to by consecutive SD entries identified by the best-yet SD pointer (and thus the SD pointer obtained in the most recent iteration of the index-compare phase if the precision threshold was exceeded). After or concurrently with the handle-fetch operation, the de-duplication engine compares the dictionary handles to the packet handles at operation 751 within the handle-compare phase, encoding dictionary-matching packet content with segment token (i.e., segment and offset) and match-extent information. In one embodiment, a match score, referred to herein as the "match precision," is assigned a value corresponding to the number or percentage of matching bytes between the input packet and dictionary (or other metric indicating match quality), thereby enabling the de-duplication engine to determine whether a dictionary update or insertion is warranted for a given input packet.

Returning to the index-compare phase, if the index score does not exceed the precision threshold, the next segment-dictionary pointer within the handle-search-identified access-table entry is evaluated at 745 and, if not null, another index-compare iteration is carried out starting at 737. If the segment-dictionary pointer is null, then all dictionary index sequences identified by segment-dictionary pointers in the currently indexed access-table entry have been scored. In that case, the highest index score identified in the dictionary search operation thus far is evaluated at 747 to determine whether the best-yet index score exceeds a low-precision threshold. If so, the de-duplication engine may execute the handle-retrieval and handle match phases (i.e., operations 749 and 751), applying the handles specified by the dictionary index sequence that yielded the best-yet index score. Otherwise, the de-duplication engine may revert to the handle-search phase, incrementing the packet-offset at 729 and then, if the maximum packet offset hasn't been exceeded, performing another handle search at the new packet offset.

In one embodiment, if the entire handle-search window has searched (i.e., affirmative determination at decision block 731) and at least one segment-dictionary pointer that yields a non-zero index score has been found (i.e., at least one matching index between the sequences of indices compared in the index-compare phase), then handle-retrieval and handle-compare operations at 749 and 751 are carried out despite failure to obtain an index score above the low-precision threshold. If no non-zero index score was obtained within the entire search window (e.g., either no non-null segment-dictionary pointers were identified, or all or substantially all dictionary indices mismatched their packet counterparts for each valid segment-dictionary pointer), then a zero-valued match precision may be returned as the dictionary search result, thus triggering a dictionary insert operation as shown within FIG. 7A.

Figure 8B:
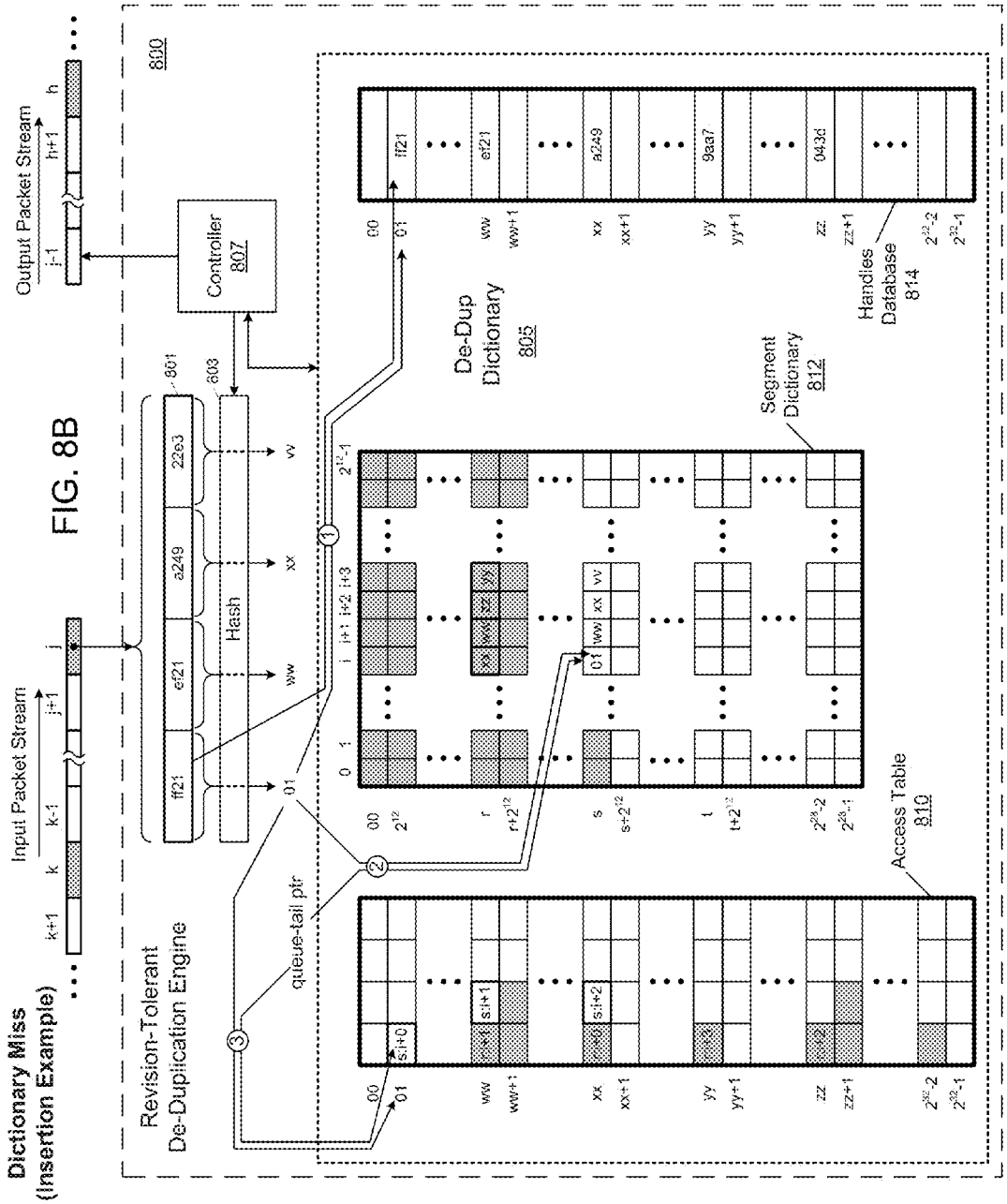

FIGS. 8A-8G illustrate exemplary operations within a revision-tolerant de-duplication engine 800 implemented in accordance with the general principles and features described in reference to FIGS. 6, 7A and 7B. Specifically, FIGS. 8A and 8B illustrate dictionary insertion operations that follow dictionary misses, and FIGS. 8C-8G illustrate exemplary operations carried out in response to a dictionary-hit.

Starting with FIG. 8A, packet 'h' within an input packet stream is determined to miss the dictionary and thus require dictionary insertion. For purposes of example, each packet in the input packet stream is assumed to be a 128-byte fixed-length entity, search handles and dictionary handles are assumed to be 32-byte entities, handle indices are assumed to be 4 byte entities (thus enabling a handle database 814 having $2^{32}$ entries, and an access table 810 also having $2^{32}$ entries), and segment dictionary pointers stored within the access table are assumed to be 5 byte entities (thus enabling storage of $2^{40}$ entries within segment dictionary 812).

Further, each access-table entry is assumed to include storage for four segment-dictionary pointers (thus effecting a two-dimensional array of segment-dictionary pointers) so that different handles which yield the same hash value may both be represented in the access table (i.e., each handle receiving a different slot within the same access-table entry). Also, each "segment" within the segment dictionary (conceptually shown as a row of the segment dictionary) is assumed to include 128 handle-dictionary pointers, and thus spans a physical length of 512 bytes and a virtual length of 4096 bytes (i.e., 128 handle indices*32 bytes per indexed handle). These exemplary packet, handle, pointer and dictionary dimensions are carried forth in the examples that follow, but in all cases any or all of the dimensions may vary.

In the particular example shown, input packet 'h' is loaded into a packet buffer 801 and assumed to include four handles having the exemplary values shown (note that only a 16-bit fragment of the each 256-bit handle is depicted). A hash generator 803, operating in response to controller 807, generates handle indices (i.e., 32-bit hash values) 'xx', 'ww', 'zz', and 'yy' for the four handles within packet buffer 801, and, as shown at '1', controller 807 directs a sequence of memory write operations to store the input handles within handles database 814 at locations specified by their respective handle indices. In one embodiment, controller 807 operates segment dictionary 812 as a ring buffer or rotating queue, advancing a pointer to a tail (i.e., empty or least-recently-stored) entry of the queue as each new handle index is stored therein. In the example of FIG. 8A, the segment dictionary 812 is assumed to be partially filled (i.e., as indicated by the shaded entries), with the queue tail pointer pointing to an entry at offset 'i' within segment 'r.' Accordingly, as depicted at '2' the controller loads the indices of the four handles into the segment-dictionary entries, r:i, r:i+1, r:i+2, r:i+3 as shown (i.e., 28-bit segment number, r, and 12-bit segment offset, thus forming an exemplary 40-bit segment-dictionary pointer), advancing the queue tail pointer to point to the next segment-dictionary entry to be loaded.

To complete the dictionary insertion operation, the segment-dictionary address (or pointer) of each inserted handle index (i.e., the value of the queue tail pointer) is loaded into access table 810 at the location indicated by the handle index of the handle being inserted. In one embodiment, each access table entry includes a pair of status bits that indicate which of the four pointer slots within a given access-table entry is next to be loaded, thus enabling each access-table entry to be operated as a rotating queue (i.e., loading a segment-dictionary pointer in each empty slot in succession until all slots have been filled, then overwriting the least-recently-loaded pointer). In the particular example shown, the access-table entries indexed by the four input handles (i.e., at 'xx,' 'ww', 'zz', and 'yy') are assumed to be empty (occupied entries being shaded) so that the segment dictionary pointers r:i+0, r:i+1, r:i+2 and r:i+3 are loaded into an initial pointer-slot (i.e., array storage element) within the access-table entries specified by the four handle indices as shown at '3.' Because input packet 'h' missed the dictionary, controller 807 forwards the packet to the output packet stream without encoding (i.e., just behind packet 'h−1'). Assuming that a counterpart de-duplication engine is present at the data destination, the receipt of non-encoded packet 'h' will trigger a corresponding insertion operation in the destination de-duplication engine, thereby maintaining end-to-end dictionary synchronization.

FIG. 8B illustrates another exemplary insertion-after-miss within de-duplication engine 800. In this case, packet T includes two of the same handles as packet 'h', but in a different handle sequence. Consequently, when a search is carried out for packet 'j,' the match precision may be below the de-duplication threshold (i.e., only one out of four handle indices in the input sequence match counterpart indices within the dictionary sequence), resulting in the insertion operations shown. That is, the four handles are stored in handles database 814 at their respective handle indices as shown at '1', the sequence of handle indices is stored within segment dictionary 812 at the location indicated by the queue-tail pointer (i.e., as shown at '2'), and pointers to the segment dictionary entries are stored within access table 810 as shown at '3'. The access-table and handles-database entries at index 'vv' are not shown. Note that the two pre-existing handles 'ef21' and 'a249' may be overwritten within handles database 814 as part of the handle storage operation, or the de-duplication engine may determine that those handles have already been stored and thus store only the two "new" handles. The resulting content of handles database 814 is the same in either implementation. In contrast, within access table 810, the pre-existing segment-dictionary pointers to handle indices 'ww' and 'xx' are preserved, and the next available pointer slots at the access-table entries indexed by indices 'ww' and 'xx' are loaded with the segment-dictionary pointers of the newly stored indices (i.e., s:i+1, and s:i+2). As discussed below, this operation permits either of the two sequences that include index 'xx' or 'ww' to be identified in a handle search.

Figure 8C:
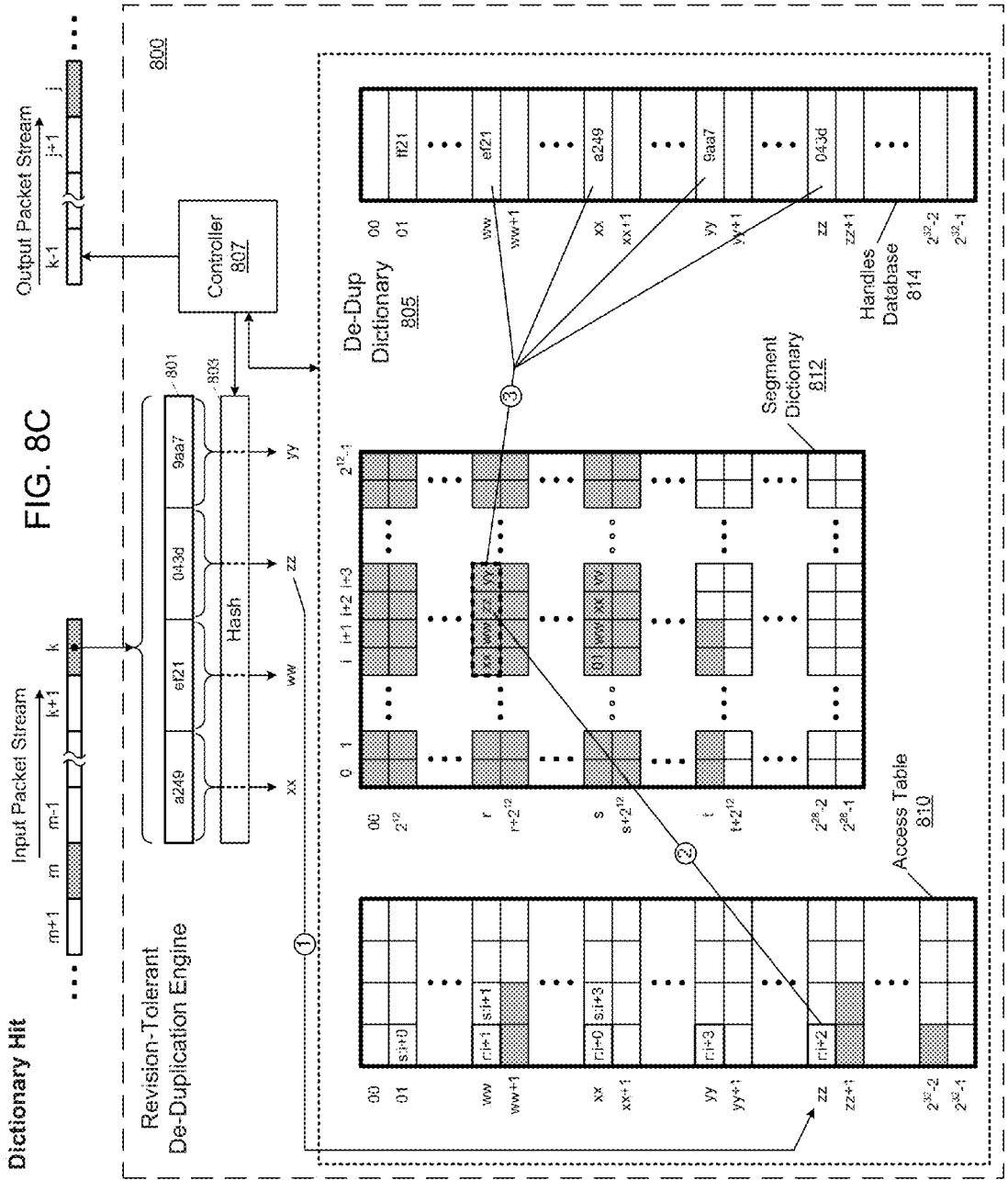

FIG. 8C illustrates the generalized flow of a dictionary-hit within de-duplication engine 800 resulting from receipt of a packet 'k' that precisely matches previously-inserted packet 'h'. First, an iterative handle-search is executed to identify a valid handle index as shown at '1' (i.e., indexing to an access-table entry having at least one non-null segment-dictionary pointer). An index comparison is then executed to compare the packet handle indices (i.e., sequence 'xx, ww, zz, yy') with the dictionary handle indices pointed to by the indexed segment-dictionary pointer, iterating as necessary to find the dictionary index sequence that yields the best or sufficiently high index score. In this case, as shown at '2', an exact instance of the packet index sequence is found within the segment dictionary, thus leading to retrieval of handles that precisely match those of the input packet as shown at '3', and thus complete encoding of the input packet bytes.

FIG. 8D illustrates exemplary iterations of the handle-search and index-compare phases that yielded the dictionary hit depicted in FIG. 8C. At the beginning of the handle-search phase, an initial packet search handle, $SH_0$, is selected at a randomly, algorithmically or heuristically determined starting offset ("so") within the packet (i.e., the packet offset is assigned the value of the starting offset for the first handle-search iteration). In the example shown, the handle index (HI) corresponding to $SH_0$ indexes to an access-table entry filled with null-pointers and thus misses the access-table and therefore the de-duplication dictionary as a whole. De-duplication engine 800 responds to the handle-miss by advancing the packet offset (to starting offset+1 byte) to obtain a new search handle, $SH_1$, and executes a second handle-search iteration using the new search handle. In this case, it is assumed, for purposes of example, that the handle index produced by hashing $SH_1$ indexes to a valid access-table entry (i.e., entry containing at least one non-null segment-dictionary pointer as indicated by '*'), so that an index comparison is performed to determine the number of matching indices between the packet and dictionary index sequences. In the example shown, three whole handles (the cursor handle, one precursor handle and one post cursor handle) are hashed to yield the packet index sequence, and a corresponding dictionary index sequence is fetched from the segment dictionary at the entry pointed to by the indexed access-table pointer, including the cursor index indicated by a shaded entry in segment dictionary 812 and precursor and postcursor indices. In this particular example, it happens that only one of the three dictionary indices matches its counterpart within the packet index sequence (i.e., the cursor index), yielding a relatively low search score (e.g., '1' or '33%'). Consequently, because there are no further non-null pointers in the indexed access-table entry and the search score is below a low-precision threshold (for purposes of example, 33% is assumed to be below the low-precision threshold, though that need not be the case), the de-duplication engine returns to the handle-search phase, iteratively searching handles until search handle, SR, is reached in the i+1$^{th}$ handle search. As shown, SR coincides with handle value '043d' and thus produces an index 'zz' that indexes to a valid access-table entry. Moreover, in the ensuing index comparison, the four packet indices (four whole handles may be indexed as the packet offset is evenly divisible by the handle size (handle size is a divisor of the packet offset), and thus aligned on a handle-size boundary) exactly match the four segment dictionary indices, yielding a search score (e.g., '4' or '100%') that exceeds the high-precision threshold. Accordingly, the de-duplication engine may deem the dictionary index sequence to point to handles likely to match the handles of the input packet and proceed to the handle retrieval phase of the de-duplication operation without further handle-search or index-compare iteration.

Figure 8E:
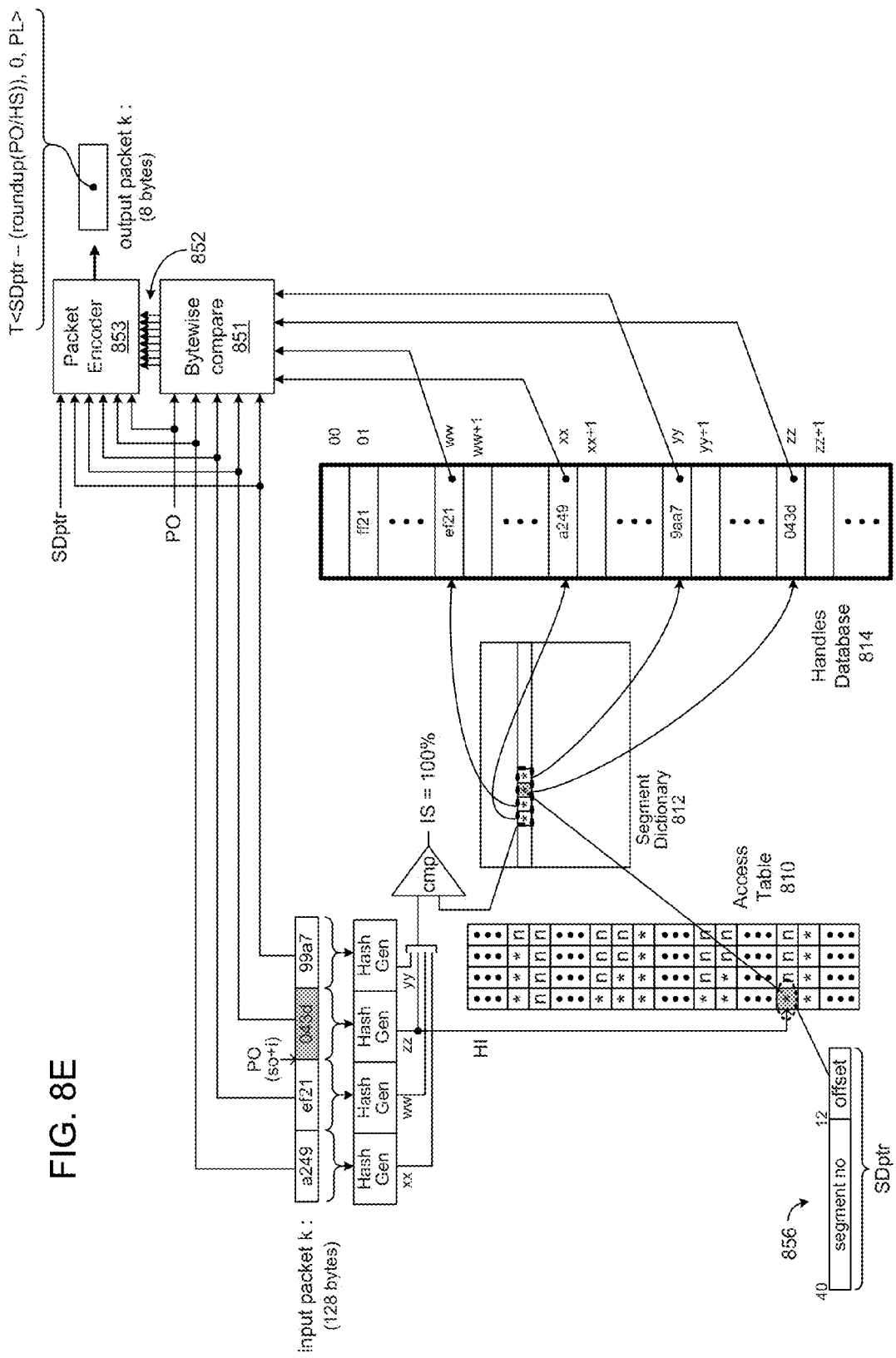

FIG. 8E illustrates exemplary executions of the handle-retrieval and handle-compare phases of the dictionary hit depicted in FIG. 8C. As shown, constituent indices of the dictionary index sequence identified in the preceding index-compare phase are applied to the handle database to fetch the corresponding handles. Thus, handle values 'a249', 'ef21', '043d' and '99a7' are retrieved from handle database addresses 'xx', 'ww', 'zz' and 'yy', respectively, and provided to bytewise-compare logic 851 (e.g., implemented by a programmed processor or dedicated compare logic and forming part of controller 807 of FIG. 8C). The packet-offset (PO) and packet-offset-defined sequence of handles within input packet k are also supplied to bytewise compare logic 851 and to packet-encoder 853 (the packet encoder also being implemented by a programmed processor or dedicated logic and also forming part of controller 807 of FIG. 8C). Bytewise-compare logic 851 compares each byte of each dictionary handle with a corresponding byte of the corresponding packet handle, issuing match signals 852 that indicate byte-for-byte match or mismatch results to the packet encoder 853. The packet encoder, which also receives the search-identified segment-dictionary pointer (SDptr) and the packet offset (thus enabling determination of the relative offset between the search-identified packet handle sequence and the packet boundaries), carries out a packet encoding operation to generate an output packet in which dictionary-matched data is replaced by segment identification and extent information. In one embodiment, for example, a pointer to the segment dictionary entry that points to the initial dictionary handle containing packet-matched data is presented, together with a value indicating the offset into the initial dictionary handle at which the packet matching data occurs, and a run-length value that indicates the number of contiguous bytes spanned by the byte-string. In the particular example shown, an escape token (T) marks the beginning of the dictionary-matched encoding, followed by a pointer to an instance of the dictionary-matched byte-string within the segment dictionary, followed by the length the byte-string. In this case, the pointer to the start of the dictionary-matched byte-string is effected by a (1) pointer to the beginning of the dictionary index sequence (i.e., cursor pointer SDptr minus the number of precursors spanned by the packet footprint and given by roundup (PO/HS), where 'HS' is the handle size and '/' denotes division and 'roundup( )' denotes a rounding up of any remainder of the division), (2) a zero-valued handle offset (because the matching data starts at the beginning of the handle pointed to by segment-dictionary pointer), SDptr−(PO/HS), and the run-length of the match (in this case, the packet length, PL). As shown at 856, the segment-dictionary pointer may be viewed as including segment number and segment offset fields. If the dictionary-instance of the matching byte-string spans a segment boundary (i.e., appears partly in two different segments), both segments may be referenced in the encoding operation. Alternatively, packet encoding may be truncated at the segment boundary if the remaining bytes to be encoded is smaller than a boundary-span threshold, thus trading off compression for operational efficiency.

Figure 8F:
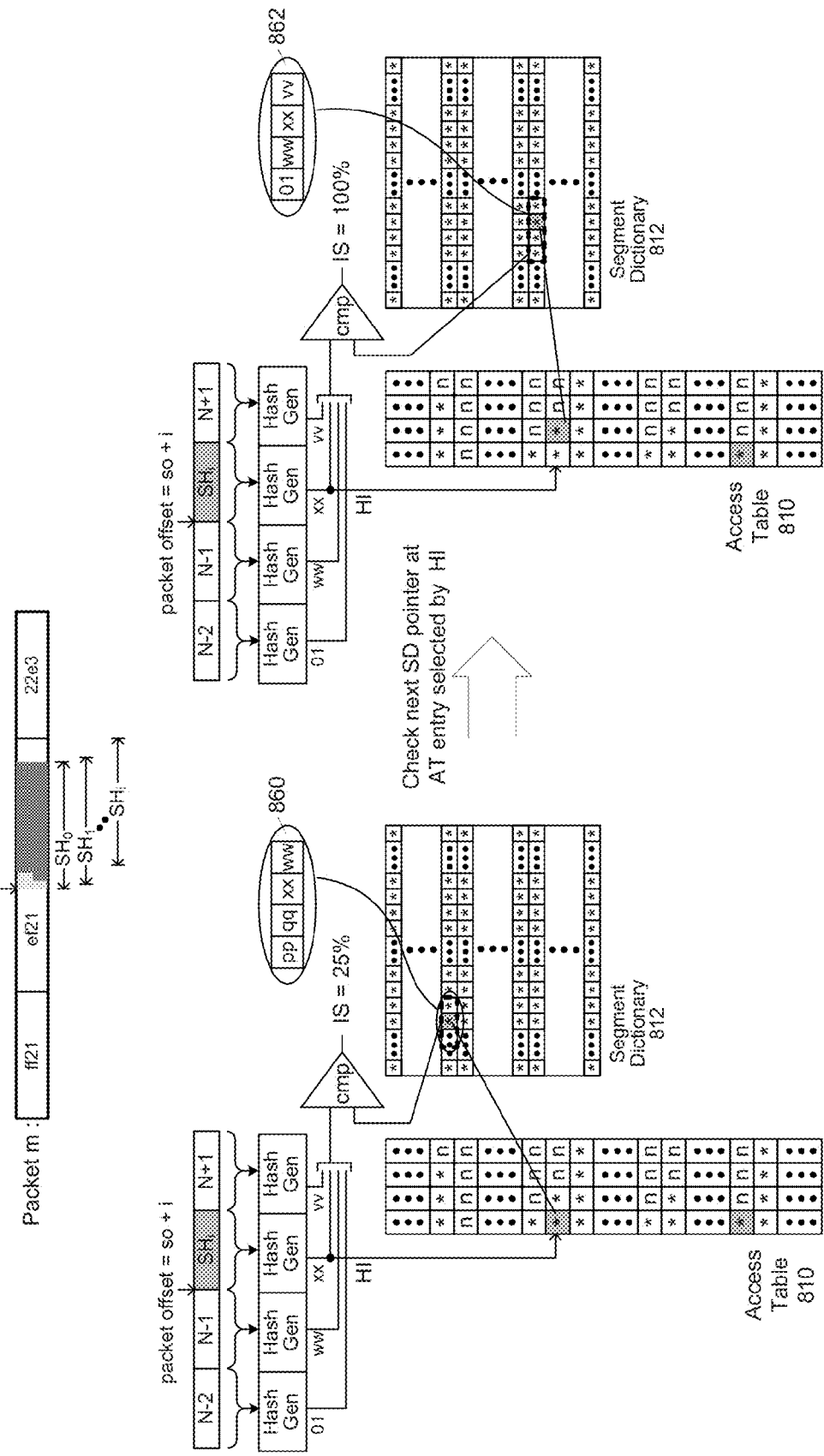

FIG. 8F illustrates an example of handle-search and index-compare operations in a circumstance in which two valid segment-dictionary pointers are found at the same handle index. That is, the packet offset is advanced through packet 'm' until a handle having value 'a249' is selected as the search handle ($SH_i$). Because handles bearing the same value appeared in each of previously-inserted packets 'h' and T, the resulting search handle $SH_i$ indexes to an access table entry that includes at least two pointers: a pointer to the index sequence loaded into the segment dictionary for packet 'h' (860) and a pointer to the index sequence loaded into the segment dictionary for packet T (862). In one embodiment, the de-duplication engine performs index-compare operations by following the segment-dictionary pointers in an order according to their placement within the indexed access table entry, in this case, starting with the pointer to the index sequence for packet 'h' (in alternative embodiments, the de-duplication engine may follow the segment-dictionary pointers in the reverse of their load order, using the queue pointer to obtain the most-recently loaded pointer, and proceeding to less-recently loaded pointers as necessary). The ensuing index-comparison yields a relatively low index score for index sequence 860 (e.g., 25%) as only one of four handle indices (the cursor index 'xx'), matches the counterpart index within the dictionary index sequence. Note that the dictionary and packet index sequences each include handle index 'ww', but at non-matching locations relative to the cursor. Also, note that four indices are compared due to the alignment of the packet offset at a handle boundary within the packet (i.e., there are two whole precursor handles, in addition to the cursor and post-cursor handles—or, said another way, the PO div HS=2, where 'div' denotes integer division).

Still referring to FIG. 8F, assuming that the index score (25%) obtained in the first index-compare operation is below the high-precision threshold, the de-duplication engine proceeds to evaluate the next segment-dictionary pointer within the access-table entry indexed by the 'xx' handle index. As shown, that segment-dictionary pointer specifies index sequence 862 corresponding to packet T (inserted as shown in FIG. 8B) and thus yields a perfectly matching index score when compared with the packet index sequence. Accordingly, the handles pointed to by the segment-dictionary indices corresponding to packet T are retrieved and compared with the handles of the input packet in subsequent handle-retrieval and handle-compare phases (not specifically shown).

Figure 8G:
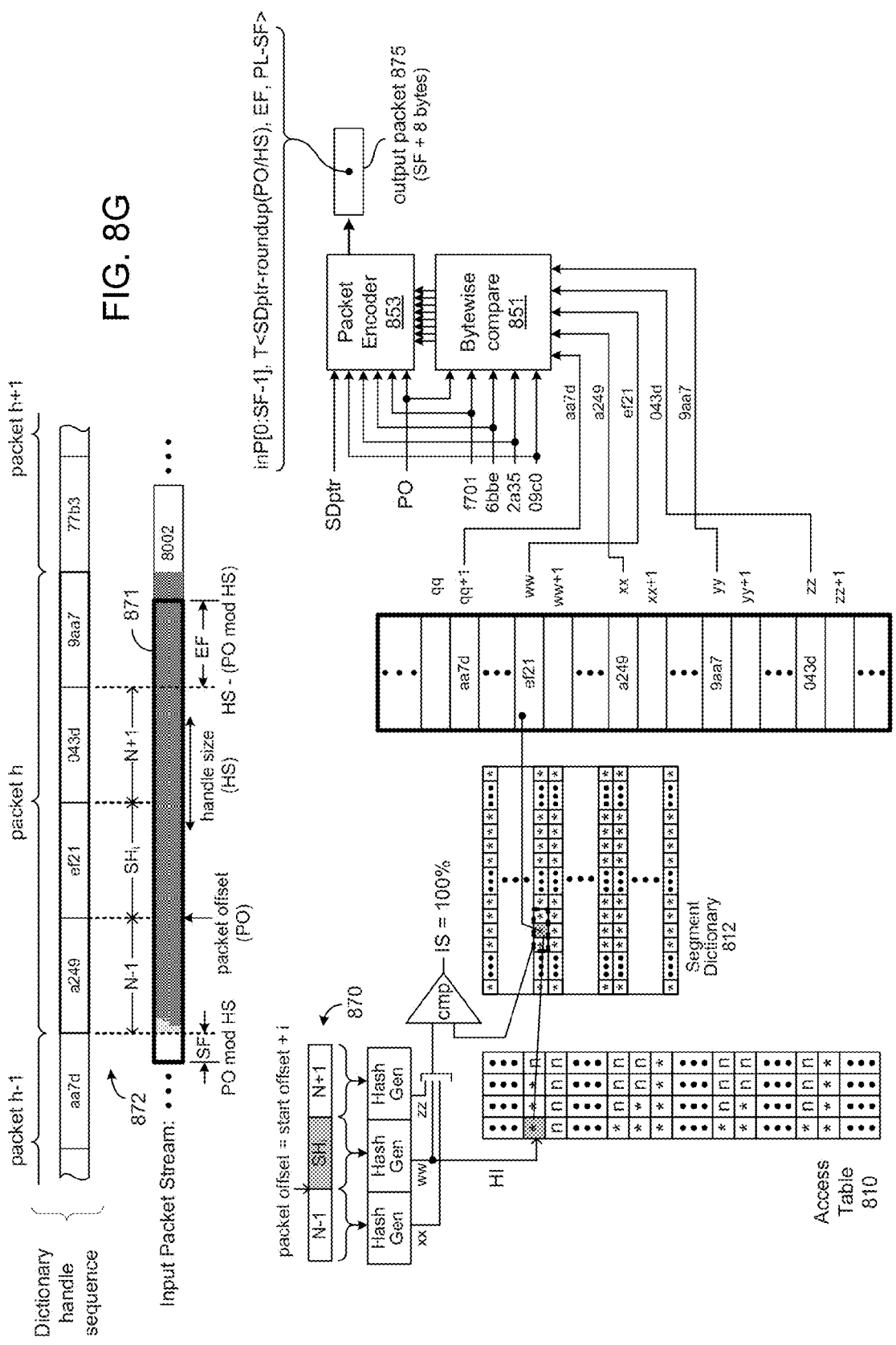

FIG. 8G illustrates exemplary phases of a de-duplication operation in a packet stream that includes a whole instance of input packet 'h' and neighboring packets 'h+1' and 'h−1', but at shifted positions relative to packet boundaries in the input packet stream (e.g., due to data insertion, deletion or other revision). In this case, the handle-search phase eventually yields a valid handle index 'ww' at the packet offset aligned with the start of handle value 'ef21' (i.e., search handle $SH_i$); a packet offset that yields a single precursor handle (−1) and a single postcursor handle (+1) for index comparison as shown at 870. The first segment-dictionary pointer indexed by the 'ww' handle index specifies the dictionary index sequence stored for packet 'h' and thus yields an index score of 100% (or '3', if an index match count is used as the scoring metric) in the index-compare phase. Because the index score exceeds the high-precision threshold, the de-duplication engine proceeds to the handle-retrieval phase, retrieving the three handles corresponding to the indices compared in the index-compare phase, as well as the bookend handles corresponding to the precursor and postcursor indices at segment-dictionary locations offset by −2 and +2 entries, respectively, from the cursor index. In the handle compare phase, the bytewise compare logic performs an aligned comparison between the four input packet handles that form packet 871 and the five handles retrieved from the dictionary (i.e., 'aa7d', 'a249', 'ef21', '043d' and '9aa7') by offsetting the starting position within the dictionary handle sequence in accordance with the packet offset (PO). In one embodiment, for example, the first-compared byte of the dictionary handle sequence is offset from the beginning of the dictionary handle sequence by a number of bytes equal to the handle size less the integer remainder of the packet offset divided by the handle size (i.e., HS−(PO mod HS), where 'mod' is the modulus operator and 'HS' is the handle size). The effect of this "handle-compare offset" is to align the dictionary handles and input packet handles as shown at 872, with the first byte of input packet 871 being compared with the byte of handle 'aa7d' that occurs at the handle-compare offset (i.e., HS−(PO mod HS)). In terms of the input packet itself, the handle-compare offset may be viewed as the end-fraction (EF) of packet 871 that extends beyond the final whole post-cursor handle, N+1. That is, by advancing the starting position within the first byte of dictionary handle 'aa7d' by a number of bytes equal to the length of the packet end-fraction, the packet start-fraction (i.e., the fraction, SF, of packet 871 that extends beyond the first whole pre-cursor handle, N−1) will be compared with a corresponding number of bytes within the 'aa7d' dictionary handle. Although there is no guaranteed correlation between handles pointed to by adjacent indices within the segment dictionary, there is a statistical probability that pointers to handles for consecutively received packets will be stored consecutively in the dictionary, so that including all dictionary handles at least partially spanned by the footprint of the input packet (i.e., after accounting for the packet offset at which a valid handle index is found) may yield higher de-duplication performance in terms of efficiency and/or encoding efficacy than excluding partially spanned handles. In the particular example shown, the dictionary handles are assumed to have been inserted in response to dictionary misses on a sequence of packets (h−1', 'h', 'h+1') so that subsequent receipt of packets bearing the same data offset by some number of bytes may be completely encoded by one or more dictionary references. In the example shown, it is assumed that the starting fraction of the input packet does not, in fact, match the final portion of dictionary handle 'aa7d', but that all of the remaining bytes of the input packet precisely match corresponding bytes of the remaining dictionary handles. Accordingly, the encoded output packet may include each byte within the starting-fraction of the input packet (i.e., InP[0:SF−1], where 'InP[ ]' refers to a range of bytes of the input packet and 'SF' is the starting fraction, PO mod HS), followed by a dictionary reference to the remaining dictionary-matched bytes of the input packet. In the example shown, the dictionary reference includes an escape token (T) followed by (1) a segment-dictionary pointer corresponding to the search-identified segment-dictionary pointer offset by the number of precursor indices spanned by the input packet (i.e., SDptr-roundup (PO/HS) and thus a pointer to the segment-dictionary entry containing the handle index of handle 'aa7d.'); (2) an offset into the dictionary handle identified by the index at SDptr-roundup (PO/HS) equal to the end-fraction (EF) and thus, HS−(PO mod HS)); and (3), a run-length equal to the packet length (PL) minus the start-fraction (SF) and thus, PL−(PO mod HS). Continuing the exemplary pointer and handle sizes described above, the segment-dictionary pointer may be presented in a five-byte field, the dictionary-handle offset ranges from 0 to 31 and thus may be represented by a single byte (or portion of a byte) and the run-length ranges from some minimum number to 128 and thus may also represented by a single byte (or portion of a byte). Assuming that the escape token is signaled by a single byte (though more than a single byte may be used), the overall encoding of output packet 875 includes the number of bytes in the starting fraction (SF) of input packet 871, plus an eight-byte dictionary reference to the remainder of the input packet bytes.

In the exemplary dictionary-hit shown in FIG. 8G, the packet handle sequence matches the retrieved dictionary handles almost entirely (i.e., all except the start-fraction). Consequently, the overall match precision (e.g., a count of matching bytes) is likely to exceed the update threshold (see FIG. 7A, decision 711) so that no dictionary update is required. By contrast, if one or more indices within the segment dictionary fail to match counterpart indices obtained from the packet handle sequence and/or portions of one or more handles in the packet handle sequence fail to match counterpart portions of the dictionary handles, the de-duplication engine may update the dictionary entry in place by overwriting handle indices within the segment dictionary as necessary (to match the indices of the packet index sequence), storing handles corresponding to the overwritten indices as necessary (e.g., to ensure that the handle from the packet handle sequence corresponding to the updated handle index is stored within the handles database) and/or overwriting handles within the handles database (e.g., where a retrieved handle fails to match its counterpart within the packet handle sequence).

Still referring to FIG. 8G, the de-duplication engine may also exploit the packet offset determined in the dictionary hit when de-duplicating the next packet. In one embodiment, for example, whenever the match precision resulting from a given dictionary search exceeds the de-duplication threshold (i.e., such that packet data is replaced with dictionary-reference information), the de-duplication engine may apply the packet offset of the search handle that yielded the dictionary hit in the next packet de-duplication operation. Alternatively the de-duplication engine may scale the packet offset of the search handle that yielded the dictionary hit to correspond to the first whole handle spanned by the ensuing packet (i.e., PO=PO mod HS). Further, a history of matching packet offsets may be maintained and applied algorithmically before or after initiating a window search (i.e., stepping the packet offset through a byte range according to the handle size).

Figure 9:
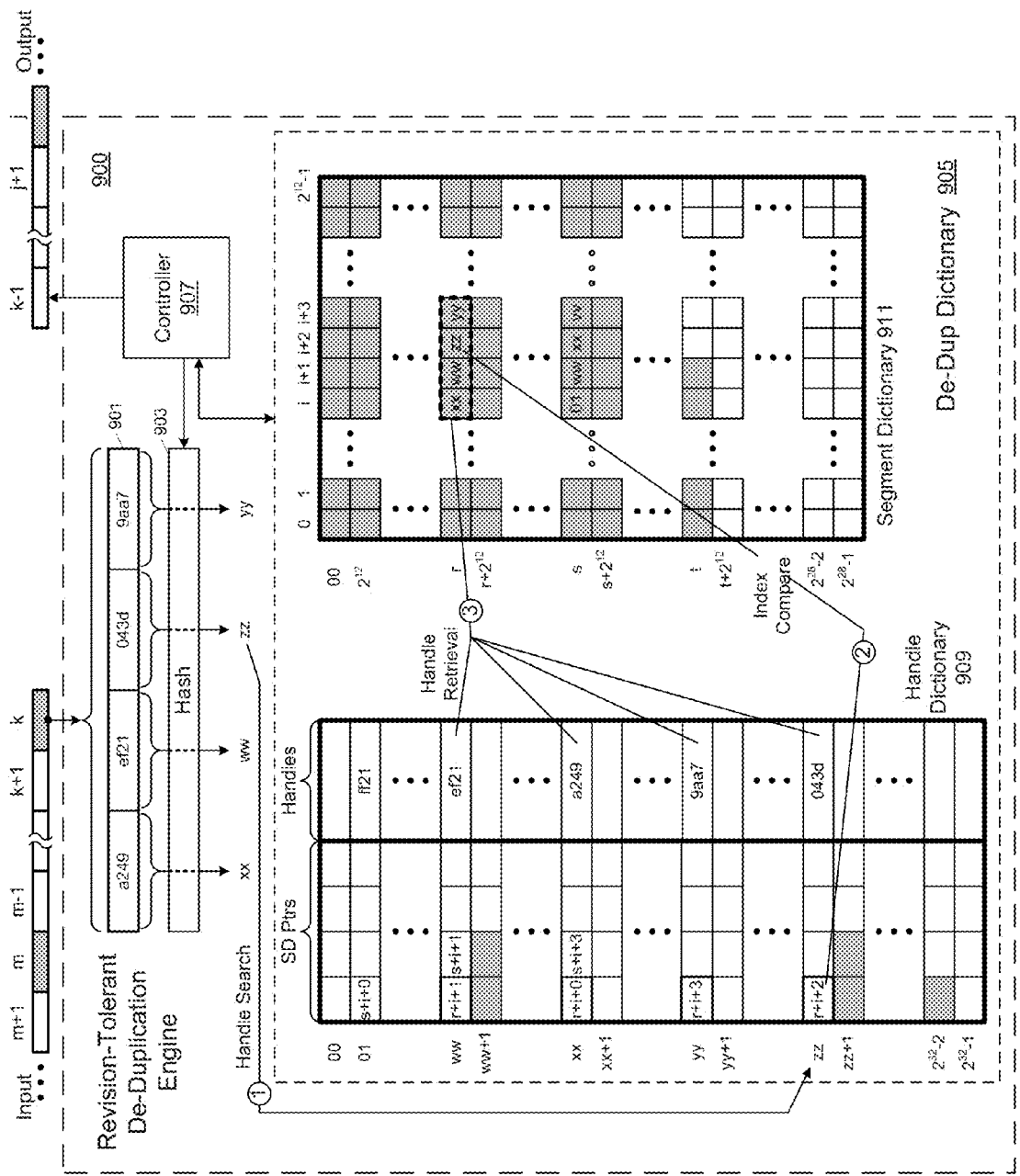
FIG. 9 illustrates an alternative embodiment of a revision-tolerant de-duplication engine having a de-duplication dictionary in which the handles database is integrated with the access table to form a handles dictionary.

FIG. 9 illustrates an alternative embodiment of a revision-tolerant de-duplication engine 900 having a de-duplication dictionary 905 in which the handles database is integrated with the access table to form a handles dictionary 909. Thus, handles dictionary 909 includes pointers to entries within segment dictionary 911, and entries within the segment dictionary 911 include pointers to handles within handles dictionary 909. In general, controller 907 executes the same sequence of operations to search the de-duplication dictionary as described in reference to FIGS. 6-8 (including buffering an input packet in 901 and hashing handles of the input packet in hash generator 903), except that both segment-dictionary pointers and handles may be fetched in each handle-dictionary access. Accordingly, after a handle-search yields a valid handle-dictionary index ('zz') as shown at '1', an index comparison may be executed to compare a dictionary index sequence with the input index sequence as shown at '2', followed by the handle-retrieval at '3' and then a handle comparison (not specifically shown). Assuming that the handle-to-packet ratio is the same as in the examples above (i.e., 4:1), the number of memory-access operations required in the handle retrieval phase may be reduced by 25% through combined fetching of the segment-dictionary pointers and dictionary handle indexed by a given search handle.

As in the embodiments described in reference to FIGS. 1-5, the data de-duplication techniques and structures described in reference to FIGS. 6-9 are not limited to application with fixed-length segments and instead may be applied to de-duplicate variable length segments. For example, variable length segments obtained by fingerprint-based "chunking" of an input stream (or any other content-based or content-independent basis for dynamically determining the length of the segment) may still be de-duplicated by carrying out the above-described handle-search, index-compare, handle-retrieval and handle-compare operations. In such an embodiment, the handles may be of fixed size, and if the chunk size (defined by fingerprint or other breakpoint) is not a multiple of the handle size, then a marginal number of bytes at either end of the chunk may be ignored. A variable sized handle (e.g., obtained through a chunking technique itself) may also be used. In one embodiment, for example, a sequence of bytes within a variable-length handle may be selected (e.g., based on a heuristically- or otherwise-determined property of the content of that sequence of bytes) and used to generate a handle index. The handle index may then be used to index both the access table and the handles database as described above, with variable-length handles being stored within the handles database instead of fixed-length handles.

Figure 10:
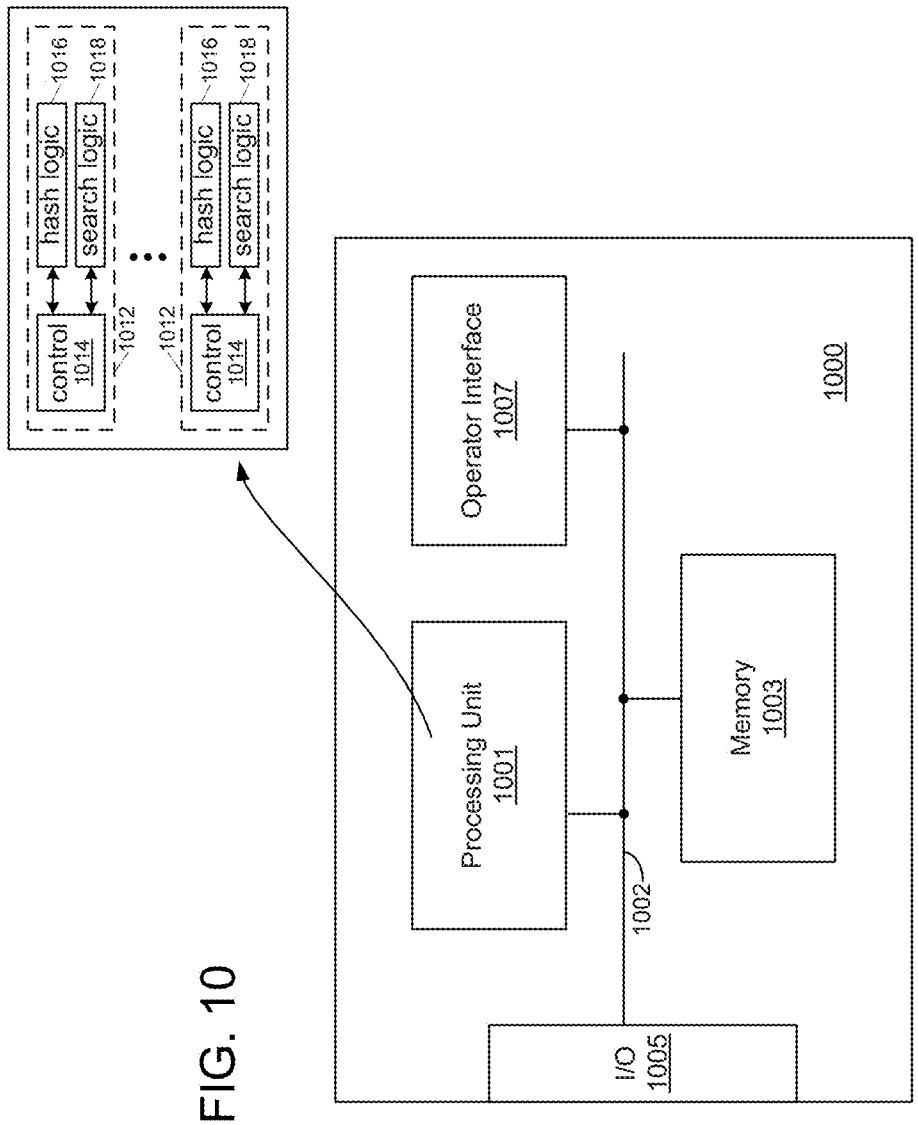
FIG. 10 illustrates a generalized embodiment of an appliance (or system or device) for executing the de-duplication operations described above.

FIG. 10 illustrates a generalized embodiment of a de-duplication appliance 1000 (or system or device) for executing the de-duplication operations described above. As shown, the appliance 1000 includes a processing unit 1001, memory 1003 for storing program code executed by the processing unit to effect the various methods and techniques of the above-described embodiments, and also to store the data streamed through the appliance (i.e., input and output data volumes or portions thereof) and one or more de-duplication dictionaries in accordance with the embodiments described above. Note that the processing unit itself may be implemented by a general or special purpose processor (or set of processing cores) and thus may execute sequences of programmed instructions to effectuate the various de-duplication operations, including phases thereof, described above (e.g., search, compare, retrieval and storage operations, as well as interaction with user or other system components to receive/fetch packets or other data to be de-duplicated and/or control packet ingress and egress).

Processing unit 1001 may alternatively or additionally include dedicated logic for carrying out handle-hashing operations (e.g., thus implementing the above-described hash generators), search and compare operations. For example, in one embodiment, the processing unit includes multiple "handle processors" 1012 that operate in parallel to carry out handle-search and index-compare phases of a de-duplication dictionary search for constituent handles. Thus, in a de-duplication engine that operates on 32-byte handles as in the exemplary embodiments above, 32 handle processors may be provided to search handles at packet offsets 0-31 in parallel (or in a pipelined manner) and thus substantially increase the handle-search and/or index-compare rates. Each handle processor may include, for example and without limitation, a processing core or other control logic 1014, hash logic 1016 and search logic 1018.

Still referring to FIG. 10, de-duplication appliance 1000 further includes one or more input and/or output (I/O) ports 1005 for receiving and outputting data, and a user interface 1007 to present and receive information to a human or artificial operator and thus enable an operator to control de-duplication policies (e.g., set configuration values, programmable thresholds or other values, etc.) and also to interact with the appliance in a manner intended by any of its other functions (e.g., the appliance may be a network appliance that additionally establishes a firewall or performs other functions). Though not shown, numerous other functional blocks may be provided within the appliance according to its de-duplication and other functions, and the appliance itself may be a component in a larger host appliance or network of appliances. Further, the functional blocks are depicted as being coupled by a communication path 1002 which may include any number of shared or dedicated buses or signaling links. More generally, the functional blocks shown may be interconnected in a variety of different architectures and individually be implemented by a variety of different underlying technologies and architectures. With regard to the memory architecture, for example, multiple different classes of storage may be provided within memory 1003 to store different classes of data. For example, non-volatile storage media such as fixed or removable magnetic, optical, or semiconductor-based recording media may be provided to store executable code and related data (or receivable within such system to enable receipt of such executable code and related data), while volatile storage media such as static or dynamic RAM for storing one or more de-duplication dictionaries and other variable data.

The various de-duplication methods and techniques disclosed herein may be implemented through execution of one or more a sequences of instructions (i.e., software program(s)) within the processing unit 1001, or by a custom-built hardware ASIC (application-specific integrated circuit), or programmed on a programmable hardware device such as an FPGA (field-programmable gate array), or any combination thereof within or external to processing unit 1001.

Electronic Representation of Physical Embodiments

Any of the various methodologies disclosed herein and/or user interfaces for configuring and managing same may be implemented by machine execution of one or more sequences instructions (including related data necessary for proper instruction execution). Such instructions may be recorded on one or more computer-readable media for later retrieval and execution within one or more processors of a special purpose or general purpose computer system or consumer electronic device or appliance, such as the system, device or appliance described in reference to FIG. 10. Computer-readable media in which such instructions and data may be embodied include, but are not limited to, non-volatile storage media in various forms (e.g., optical, magnetic or semiconductor storage media) and carrier waves that may be used to transfer such instructions and data through wireless, optical, or wired signaling media or any combination thereof. Examples of transfers of such instructions and data by carrier waves include, but are not limited to, transfers (uploads, downloads, e-mail, etc.) over the Internet and/or other computer networks via one or more data transfer protocols (e.g., HTTP, FTP, SMTP, etc.).

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of de-duplicating a data volume, the method comprising:
   generating a sequence of indices based upon respective input data units within the data volume, the sequence of indices including a first index generated based upon a first input data unit of the input data units;
   reading a pointer value from a storage location within a lookup table indicated by the first index, the pointer value identifying a first sequence of entries within a first dictionary, the first sequence of entries including respective address values that point to respective dictionary data units included in a database of dictionary data units;
   comparing the address values included within the first sequence of entries with the sequence of indices to produce a scoring value that indicates a likely extent of a match between the dictionary data units and the input data units;
   if the scoring value exceeds a first threshold, comparing at least one of the dictionary data units pointed to by an entry of the first sequence of entries with the first input data unit; and
   substituting information representative of the one of the dictionary data units for at least a portion of the first input data unit determined to match a counterpart portion of the one of the dictionary data units.

2. The method of claim 1 wherein the data volume comprises at least part of a packet of data within an input packet stream.

3. The method of claim 1 further comprising selecting a first offset within the data volume, and wherein generating the sequence of indices based upon respective input data units within the data volume comprises selecting the first input data unit from a location within the data volume indicated by the first offset.

4. The method of claim 1 further comprising
   generating a second sequence of indices based a second sequence of input data units within the data volume if the scoring value does not exceed the first threshold.

5. The method of claim 4 further comprising:
   accessing the lookup table to identify a second sequence of entries within the first dictionary; and
   comparing address values within the second sequence of entries with the second sequence of indices.

6. The method of claim 4 wherein further comprising selecting a first offset within the data volume, and wherein generating the sequence of indices based upon respective input data units within the data volume comprises selecting the first input data unit from location within the data volume indicated by the first offset, and wherein generating the second sequence of indices based a second sequence of input data units within the data volume comprises selecting the second sequence of input data units based on a second offset within the data volume, the method further comprising adjusting the first offset to generate the second offset.

7. The method of claim 1 wherein accessing the lookup table using the index to identify a first sequence of entries within a first dictionary comprises iteratively generating search indices corresponding to input data units at respective offsets within the data volume at least until one of the search indices, when applied to lookup an entry within the lookup table, yields a valid address of an entry within the first dictionary.

8. The method of claim 1 wherein generating the first index comprises generating a hash value based on the first input data unit.

9. The method of claim 1 wherein each of the dictionary data units has a fixed length, in bytes, that matches a length of the first input data unit.

10. The method of claim 1 wherein the one of the dictionary data units has a length, in bytes, that is different from the length of at least one other of the dictionary data units.

11. A de-duplication device comprising:
    one or more memories to store a database of dictionary data units, a first dictionary to store address values that point to entries within the database of dictionary data units, and a lookup table to store address values that point to entries within the first dictionary; and
    a processing unit to:
      generate a sequence of indices based upon respective input data units within a data volume, the sequence of indices including a first index generated based upon a first input data unit of the input data units;
      read a pointer value from a storage location within the lookup table indicated by the first index, the pointer value identifying a first sequence of entries within the first dictionary, the first sequence of the entries including respective address values that point to respective dictionary data units included in the database of dictionary data units;

compare the address values included within the first sequence of entries with the sequence of indices to produce a scoring value that indicates a likely extent of a match between the dictionary data units and the input data units;

if the scoring value exceeds a first threshold, compare at least one of the dictionary data units pointed to by an entry of the first sequence of entries with the first input data unit; and substitute information representative of the one of the dictionary data units for at least a portion of the first input data unit determined to match a counterpart portion of the one of the dictionary data units.

12. The de-duplication device of claim 11 wherein the processing unit comprises a programmed processor.

13. The de-duplication device of claim 11 wherein the processing unit comprises a plurality of handle processors to concurrently generate constituent indices of the sequence of indices, the constituent indices corresponding to input data units at respective offsets within the data volume.

14. The de-duplication device of claim 11 wherein the one or more memories comprise a plurality of separately addressable memories.

15. The de-duplication device of claim 11 wherein the processing unit is implemented at least in part by one or more integrated circuit devices.

16. The de-duplication device of claim 11 wherein each of the dictionary data units within the database of dictionary data units has a fixed length, in bytes, that matches a length of the first input data unit.

17. The de-duplication device of claim 11 wherein at least one of the dictionary data units has a length, in bytes, that is different from the length of at least one other of the dictionary data units.

18. A de-duplication apparatus comprising:
means for generating a sequence of indices based upon respective input data units within a data volume, the sequence of indices including a first index generated based upon a first input data unit of the input data units;
means for reading a pointer value from a storage location within a lookup table indicated by the first index, the pointer value identifying a first sequence of entries within a first dictionary, the first sequence of entries including respective address values that points to respective dictionary data units included in a database of dictionary data units;
means for comparing the address values included within the first sequence of entries with the sequence of indices to produce a scoring value that indicates a likely extent of a match between the dictionary data units and the input data units;
means for comparing at least one of the dictionary data units pointed to by an entry of the first sequence of entries with the first input data unit if the scoring value exceeds a threshold; and
means for substituting information representative of the one of the dictionary data units for at least a portion of the first input data unit determined to match a counterpart portion of the one of the dictionary data units.

19. The de-duplication apparatus of claim 18 further comprising means for storing the lookup table, first dictionary and database of dictionary data units.

20. A non-transitory computer-readable medium having one or more sequences of instructions embodied therein which, when executed by a processing unit, cause the processing unit to:
generate a sequence of indices based upon respective input data units within the data volume, the sequence of indices including a first index generated based upon a first input data unit of the input data units;
read a pointer value from a storage location within a lookup table indicated by the first index, the pointer value identifying a first sequence of entries within a first dictionary, the first sequence of entries including respective address values that points to respective dictionary data units included in a database of dictionary data units;
compare the address values included within the first sequence of entries with the sequence of indices to produce a scoring value that indicates a likely extent of a match between the dictionary data units and the input data units;
if the scoring value exceeds a first threshold, compare at least one of the dictionary data units pointed to by an entry of the first sequence of entries with the first input data unit; and
substitute information representative of the one of the dictionary data units for at least a portion of the first input data unit determined to match a counterpart portion of the one of the dictionary data units.

21. The method of claim 1 wherein the lookup table, first dictionary and database of dictionary data units are stored in separately addressable memories.

* * * * *